United States Patent
Horita et al.

(10) Patent No.: US 11,487,748 B2
(45) Date of Patent: Nov. 1, 2022

(54) IN-VEHICLE PROCESSING DEVICE

(71) Applicant: Hitachi Automotive Systems, Ltd., Hitachinaka (JP)

(72) Inventors: Yuki Horita, Tokyo (JP); Kohei Sakurai, Hitachinaka (JP); Makoto Kudo, Hitachinaka (JP); Kentaro Yoshimura, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 146 days.

(21) Appl. No.: 16/338,136

(22) PCT Filed: Sep. 8, 2017

(86) PCT No.: PCT/JP2017/032518
§ 371 (c)(1),
(2) Date: Mar. 29, 2019

(87) PCT Pub. No.: WO2018/066305
PCT Pub. Date: Apr. 12, 2018

(65) Prior Publication Data
US 2020/0034354 A1 Jan. 30, 2020

(30) Foreign Application Priority Data
Oct. 3, 2016 (JP) .............................. JP2016-195804

(51) Int. Cl.
*G06F 16/23* (2019.01)
*G06F 16/2455* (2019.01)
*B60R 16/023* (2006.01)

(52) U.S. Cl.
CPC ...... *G06F 16/2379* (2019.01); *B60R 16/0231* (2013.01); *G06F 16/2455* (2019.01)

(58) Field of Classification Search
CPC .............. B60R 16/023; B60R 16/0232; B60R 16/0233; B60R 16/0237; B60R 16/027;
(Continued)

(56) References Cited

U.S. PATENT DOCUMENTS 6,236,909 B1 * 5/2001 Colson ...................... G06F 8/24
 123/357
6,236,910 B1 5/2001 Iwai et al.
(Continued)

FOREIGN PATENT DOCUMENTS

JP 2000-97102 A 4/2000
JP 2002-331882 A 11/2002
(Continued)

OTHER PUBLICATIONS

Periera et al., "An Integrated Architecture for Autonomous Vehicles Simulation", pp. 286-292 (Year: 2012).*
(Continued)

*Primary Examiner* — Mark D Featherstone
*Assistant Examiner* — Kweku William Halm
(74) *Attorney, Agent, or Firm* — Crowell & Moring LLP

(57) ABSTRACT

An in-vehicle processing device includes: a signal input unit that generates input data based on an input signal from outside; a processing unit that executes arithmetic processing for calculating output data based on the input data; a signal output unit that generates an output signal based on the output data to output the output signal to the outside; and a storage unit that stores application software for causing the processing unit to execute the arithmetic processing. The application software includes: a data management layer for managing object data which is a collection of data corresponding to a given target element on the storage unit; a data adaptation layer for generating the object data based on the input data to output the generated object data to the data management layer; and a data operation layer for acquiring the object data from the data management layer to calculate the output data based on the acquired object data.

16 Claims, 13 Drawing Sheets

(58) Field of Classification Search
CPC ............ B60R 16/0315; G06F 16/2379; G06F 16/2455
See application file for complete search history.

(56) References Cited

U.S. PATENT DOCUMENTS

| | | | |
|---|---|---|---|
| 7,102,496 B1* | 9/2006 | Ernst, Jr. .......... | G08G 1/096725 340/436 |
| 8,849,494 B1* | 9/2014 | Herbach .......... | B60W 60/0015 701/24 |
| 2001/0025216 A1* | 9/2001 | Nishimura .............. | H04L 67/12 701/1 |
| 2003/0154404 A1* | 8/2003 | Beadles .................. | H04L 63/20 726/1 |
| 2006/0111825 A1 | 5/2006 | Okada et al. | |
| 2006/0212178 A1 | 9/2006 | Yoshimura et al. | |
| 2007/0038345 A1* | 2/2007 | Heider .................. | B60R 16/037 701/49 |
| 2010/0017416 A1* | 1/2010 | Back ...................... | G01N 33/94 707/E17.032 |
| 2017/0264511 A1* | 9/2017 | Myadam ................ | G06F 16/22 |
| 2018/0113460 A1* | 4/2018 | Koda ................ | B60W 60/0011 |
| 2018/0297611 A1* | 10/2018 | Fujisawa .............. | G01C 21/365 |
| 2019/0042863 A1* | 2/2019 | Kasuga .............. | G06K 9/00805 |
| 2019/0356552 A1* | 11/2019 | Ricci ........................ | G08G 1/09 |

FOREIGN PATENT DOCUMENTS

| | | |
|---|---|---|
| JP | 2006-142994 A | 6/2006 |
| JP | 2006-257998 A | 9/2006 |
| WO | WO 2011/040841 A1 | 4/2011 |

OTHER PUBLICATIONS

Extended European Search Report issued in European Application No. 17858144.3 dated May 8, 2020 (13 pages).

International Search Report (PCT/ISA/210) issued in PCT Application No. PCT/JP2017/032518 dated Dec. 5, 2017 with English translation (four (4) pages).

Japanese-language Written Opinion (PCT/ISA/237) issued in PCT Application No. PCT/JP2017/032518 dated Dec. 5, 2017 (three (3) pages).

European Communication Pursuant to Article 94(3) issued in European Application No. 17858144.3 dated Nov. 2, 2021 (seven (7) pages).

* cited by examiner

FIG. 4

OBJECT DATA GROUP 233

| ID | DATA SOURCE | OBJECT TYPE | TIME STAMP | SPECIFIC DATA AREA | |
|---|---|---|---|---|---|
| 100 | SENSOR A | ANOTHER VEHICLE | 00:00:10.200 | RELATIVE POSITION(x,y)=(30.0[m],0.1[m]) RELATIVE SPEED($v_x,v_y$)=(2.1[m/s],0.0[m/s]) VEHICLE WIDTH=(2.0[m],BLINKER STATE=OFF... | }410 |
| 101 | SENSOR A | PEDESTRIAN | 00:00:10.200 | RELATIVE POSITION(x,y)=(20.0[m],8.0[m]) RELATIVE SPEED($v_x,v_y$)=(-15.0[m/s],0.0[m/s]) .... | }412 |
| 102 | SENSOR A | WHITE LINE | 00:00:10.200 | TARGET TYPE="LANE BOUNDARY",LINE TYPE="DASHED LINE," POINT SEQUENCE INFORMATION(MATRIX OF x AND y)={(5.0[m],1.5[m]), ...,(40.0[m],1.5[m])}... | |
| ... | ... | ... | ... | ... | |
| 200 | SENSOR B | ANOTHER VEHICLE | 00:00:10.200 | RELATIVE POSITION(x,y)=(30.2[m],0.0[m]) RELATIVE SPEED($v_x,v_y$)=(2.0[m/s],0.0[m/s]) .... | }413 |
| ... | ... | ... | ... | ... | |
| 300 | SENSOR C | HOST VEHICLE | 00:00:10.200 | HOST VEHICLE SPEED=15.0[m/s], ... | |
| 300 | SENSOR C | HOST VEHICLE | 00:00:10.150 | HOST VEHICLE SPEED=14.7[m/s], ... | }414 |
| 300 | SENSOR C | HOST VEHICLE | 00:00:10.100 | HOST VEHICLE SPEED=14.5[m/s], ... | |
| 301 | SENSOR D | HOST VEHICLE | 00:00:10.200 | YAW RATE=0.0[deg/s], ... | |
| 301 | SENSOR D | HOST VEHICLE | 00:00:10.150 | YAW RATE=0.0[deg/s], ... | }415 |
| 301 | SENSOR D | HOST VEHICLE | 00:00:10.100 | YAW RATE=0.0[deg/s], ... | |
| ... | ... | ... | ... | ... | |
| 1000 | SENSOR FUSION | HOST VEHICLE | 00:00:10.200 | HOST VEHICLE SPEED=15.0[m/s],YAW RATE=0.0[deg/s], LANE LINE ID=5000,... | }411 |
| 1001 | SENSOR FUSION | ANOTHER VEHICLE | 00:00:10.200 | RELATIVE POSITION(x,y)=(30.0[m],0.0[m]) RELATIVE SPEED($v_x,v_y$)=(2.0[m/s],0.0[m/s]) LANE LINE ID=5000,VEHICLE WIDTH=(2.0[m], BLINKER STATE=OFF,... | |
| 1002 | SENSOR FUSION | PEDESTRIAN | 00:00:10.200 | RELATIVE POSITION(x,y)=(20.0[m],8.0[m]) RELATIVE SPEED($v_x,v_y$)=(-15.0[m/s],0.0[m/s]) .... | |
| 1003 | SENSOR FUSION | WHITE LINE | 00:00:10.200 | TARGET TYPE="LANE BOUNDARY",LINE TYPE="DASHED LINE," POINT SEQUENCE INFORMATION(MATRIX OF x AND y)={(5.0[m],1.5[m]), ...,(40.0[m],1.5[m])}... LEFT LANE LINE ID=N/A, RIGHT LANE LINE ID=5000,... | |
| ... | ... | ... | ... | ... | |

FIG. 5

SET INFORMATION DATA GROUP 234

| 501 | 502 | 503 | 504 | 505 |
|---|---|---|---|---|
| DATA SOURCE | OBJECT TYPE | DATA LENGTH | NUMBER OF HISTORIES | SEARCH KEY INFORMATION |
| SENSOR A (=0) | ANOTHER VEHICLE (=1) | 50[Bytes] | 1 | Key="RELATIVE POSITION", Type="2DVector", Offset=12[Byte] <br> Key="RELATIVE SPEED", Type="2DVector", Offset=20[Byte] <br> ... |
| SENSOR A (=0) | PEDESTRIAN (=2) | 40[Bytes] | 1 | Key="RELATIVE POSITION", Type="2DVector", Offset=12[Byte] <br> Key="RELATIVE SPEED", Type="2DVector", Offset=20[Byte] <br> ... |
| SENSOR A (=0) | WHITE LINE (=3) | 60[Bytes] | 1 | Key="TARGET TYPE", Type="INT8", Offset=12[Byte] |
| ... | ... | ... | ... | ... |
| SENSOR B (=1) | ANOTHER VEHICLE (=1) | 42[Bytes] | 1 | Key="RELATIVE POSITION", Type="2DVector", Offset=12[Byte] <br> Key="RELATIVE SPEED", Type="2DVector", Offset=20[Byte] <br> ... |
| ... | ... | ... | ... | ... |
| SENSOR C (=2) | HOST VEHICLE (=0) | 4[Bytes] | 3 | |
| SENSOR D (=3) | HOST VEHICLE (=0) | 4[Bytes] | 3 | |
| ... | ... | ... | ... | ... |
| SENSOR FUSION (=10) | HOST VEHICLE (=0) | 40[Bytes] | 1 | |
| SENSOR FUSION (=10) | ANOTHER VEHICLE (=1) | 50[Bytes] | 1 | Key="RELATIVE POSITION", Type="2DVector", Offset=12[Byte] <br> Key="RELATIVE SPEED", Type="2DVector", Offset=20[Byte] <br> Key="LINE ID", Type="INT16", Offset=28[Byte] <br> ... |
| SENSOR FUSION (=10) | PEDESTRIAN (=2) | 40[Bytes] | 1 | Key="RELATIVE POSITION", Type="2DVector", Offset=12[Byte] <br> Key="RELATIVE SPEED", Type="2DVector", Offset=20[Byte] <br> ... |
| SENSOR FUSION (=10) | WHITE LINE (=3) | 60[Bytes] | 1 | Key="TARGET TYPE", Type="INT8", Offset=12[Byte] |
| ... | ... | ... | ... | ... |

FIG. 6

```
                                                              C601
/*REGISTRATION OF OBJECT DATA API */
int registerData (size_t    dataSize,    /* REGISTRATION DATA LENGTH */
                  void      *data        /* ADDRESS OF REGISTRATION DATA */
);                                                                          } 611

/* UPDATE OF OBJECT DATA */
int updateData (size_t         dataSize,    /* UPDATE SOURCE DATA LENGTH */
                void           *data,       /* ADDRESS OF UPDATE SOURCE DATA */
                unsigned int   offset,      /* START POSITION OF AREA TO BE UPDATED */
                unsigned int   updateSize   /* LENGTH OF AREA TO BE UPDATED */
);                                                                          } 612

/* ID SEARCH OF OBJECT DATA */
int getDataByID (int       id,         /* ID OF OBJECT TO BE SEARCHED */
                 size_t    dataSize,   /* LENGTH OF STORAGE DESTINATION BUFFER */
                 void      *data       /* ADDRESS OF STORAGE DESTINATION BUFFER */
);                                                                          } 613

/* SEARCH OF OBJECT DATA */
int searchData (SearchCond_t   matchCond[],   /* SEARCH CONDITIONAL EXPRESSION */
                SortCond_t     sortCond[],    /* SORT CONDITIONAL EXPRESSION */
                size_t         dataSize,      /* LENGTH OF STORAGE DESTINATION BUFFER */
                void           *data          /* ADDRESS OF STORAGE DESTINATION BUFFER */
);                                                                          } 614

/* INTEGRATION OF OBJECT DATA */
int mergeData (int    destId,   /* ID OF INTEGRATION DESTINATION OBJECT */
               int    srcId     /* ID OF INTEGRATION SOURCE OBJECT */
);                                                                          } 615

/* HISTORY INFORMATION SEARCH OF OBJECT DATA */
int getHistoryData (int       id,         /* ID OF OBJECT TO BE SEARCHED */
                    size_t    dataSize,   /* LENGTH OF STORAGE DESTINATION BUFFER */
                    void      *data       /* ADDRESS OF STORAGE DESTINATION BUFFER */
);                                                                          } 616
...
```

/* DEFINITION OF SEARCH CONDITIONAL EXPRESSION   */
typedef struct {
     String            key;            /* KEY OF SEARCH TARGET */
     CompOperator      compOp;         /* IDENTIFIER OF COMPARISON OPERATOR */   ─711
     int               value;          /* COMPARISON TARGET VALUE */
     LogicalOperator   logicOp;        /* DENTIFIER OF LOGICAL OPERATOR */
} SearchCond_t;

/* DEFINITION OF SORT CONDITIONAL EXPRESSION   */
typedef struct {
     String            key;            /* KEY OF SORT TARGET */                  ─712
     int               order;          /* SORT ORDER */
} SortCond_t;
```

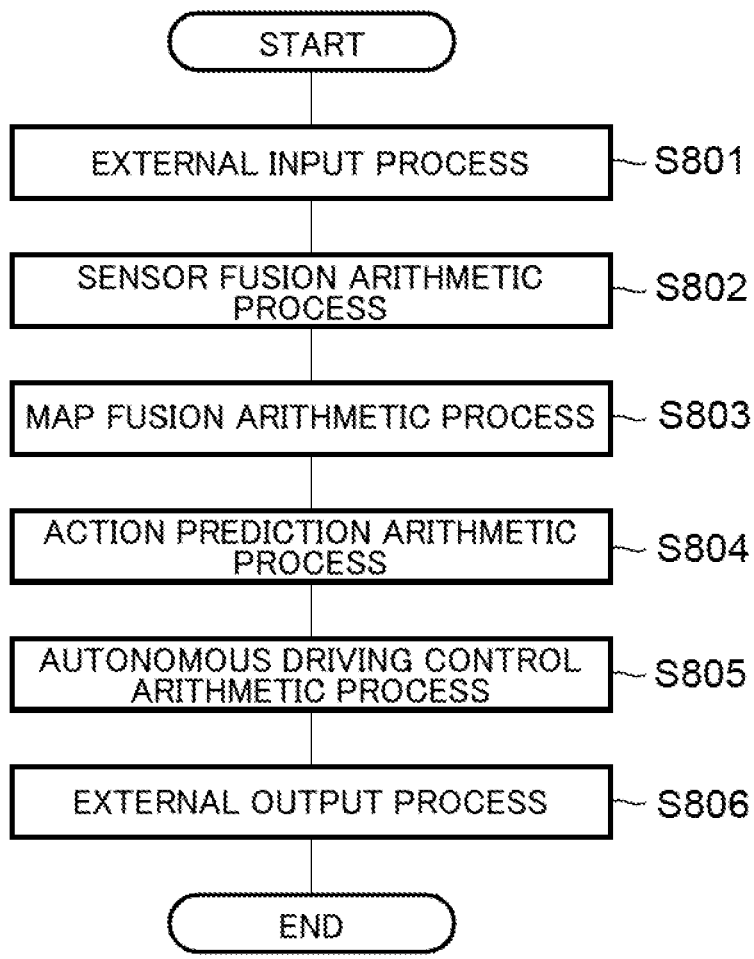

FIG. 10

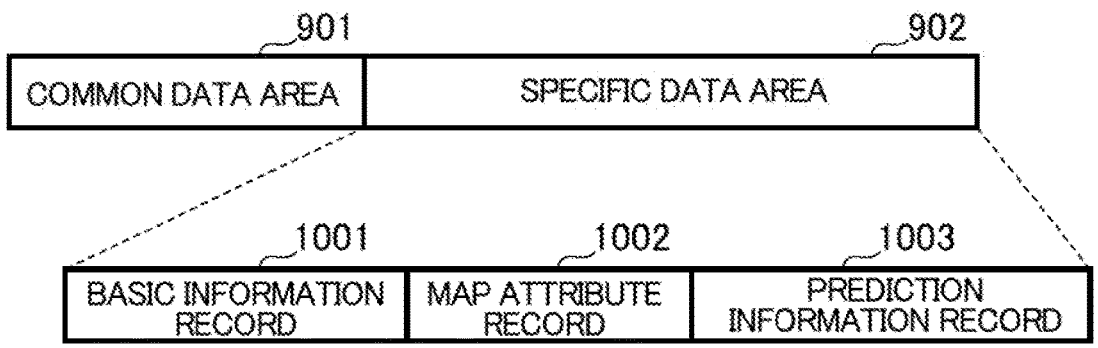

```
/* STRUCTURE OF OBJECT DATA */                                    C1004
typedef struct {
    ObjectCommonHeader    cmnHdr;    /* COMMON DATA AREA */
    BasicInfoRecord       basicRec;  /* BASIC INFORMATION RECORD */
    MapAttrRecord         mapRec;    /* MAP ATTRIBUTE RECORD */
    PredInfoRecord        predRec;   /* PREDICTION INFORMATION RECORD */
} ObjectData_t;
```

```
/* OBJECT UPDATE PROCESS OF SENSOR FUSION CALCULATION */          C1005
registerData(sizeof(object), &object);
```

```
/* OBJECT UPDATE PROCESS OF MAP FUSION CALCULATION */             C1006
updateData (sizeof(object), &object, (uint8_t *)&object - (uint8_t
*)object.mapRec,sizeof(object.mapRec));
```

```
/* OBJECT UPDATE PROCESS OF ACTION PREDICTION CALCULATION */      C1007
updateData (sizeof(object), &object, (uint8_t *)&object - (uint8_t
*)object.predRec,sizeof(object.predRec));
```

FIG. 12

SET INFORMATION DATA GROUP 234

| DATA SOURCE | OBJECT TYPE | DATA LENGTH | NUMBER OF HISTORIES | SEARCH KEY INFORMATION |
|---|---|---|---|---|
| SENSOR A (=0) | ANOTHER VEHICLE (=1) | 50[Bytes] | 1 | Key="RELATIVE POSITION", Type="2DVector", Offset=12[Byte]<br>Key="RELATIVE SPEED", Type="2DVector", Offset=20[Byte]<br>... |
| ... | ... | ... | ... | ... |
| WIRELESS COMMUNICATION DEVICE (=11) | ANOTHER VEHICLE (=1) | 45[Bytes] | 1 | |
| ... | ... | ... | ... | ... |
| SENSOR FUSION (=10) | HOST VEHICLE (=0) | 40[Bytes] | 1 | |
| SENSOR FUSION (=10) | ANOTHER VEHICLE (=1) | 60[Bytes] *CHANGE | 1 | Key="RELATIVE POSITION", Type="2DVector", Offset=12[Byte]<br>Key="RELATIVE SPEED", Type="2DVector", Offset=20[Byte]<br>Key="LINE ID", Type="INT16", Offset=28[Byte]<br>... |
| SENSOR FUSION (=10) | PEDESTRIAN (=2) | 40[Bytes] | 1 | Key="RELATIVE POSITION", Type="2DVector", Offset=12[Byte]<br>Key="RELATIVE SPEED", Type="2DVector", Offset=20[Byte]<br>... |
| SENSOR FUSION (=10) | WHITE LINE (=3) | 60[Bytes] | 1 | Key="TARGET TYPE", Type="INT8", Offset=12[Byte] |
| ... | ... | ... | ... | ... |

IN-VEHICLE PROCESSING DEVICE

TECHNICAL FIELD

The present invention relates to an in-vehicle processing device.

BACKGROUND ART

Conventionally, in an ECU (Electronic Control Unit) installed in a vehicle, a method in which a hardware configuration of an ECU and an interface (model) which abstracts (models) a sensor or an actuator connected to the ECU and transferring information between the sensor and the actuator are configured by software has been proposed. According to the above method, even if the hardware configuration inside and outside of the ECU is changed, the reusability of higher-level application software can be enhanced (refer to, for example, Patent Literature 1).

CITATION LIST

Patent Literature

Patent Literature 1: Japanese Unexamined Patent Application Publication No. 2000-97102

SUMMARY OF INVENTION

Technical Problem

The conventional ECU has a usual configuration in which control information is calculated based on an output value of a sensor (internal sensor) for detecting a given state quantity involved in a vehicle or components mounted on the vehicle, and the control information is output to a target actuator or another ECU. In such a conventional ECU, since a detection target of the sensor and a control target of the actuator are clearly determined, it is easy to configure interfaces corresponding to those targets in software. For example, in a vehicle speed sensor, it is only necessary to construct an interface by modeling a vehicle speed which is a detection target of the vehicle speed sensor may be modeled to configure an interface, and in an injector, and a fuel injection amount or the like which is a control target of the injector may be modeled to configure an interface.

However, with advances in ADAS (Advanced Driver Assistance Systems) and autonomous driving in recent years, vehicles equipped with external sensors for detecting a state of the surroundings of the vehicle in addition to the conventional internal sensors are increasing. Detection targets of the external sensor described above include various targets such as obstacles such as other vehicles and pedestrians, road shapes such as white lines and road ends, traffic rules such as signs and signals, and the like. Also, the type of the external sensor is various, such as camera, millimeter wave radar, sonar, LIDAR (LIght Detection And Ranging), and the like, depending on the detection target. Even if the sensors are of the same type, the type and amount of information to be output greatly differs from each other. For that reason, in the software of the ECU which calculates the control information based on output data of the external sensor, it is substantially difficult to configure the interface by modeling the sensor like a conventional ECU. This leads to such a problem that it is difficult to reuse the application software.

Also, like an ADAS and an ECU involved in the autonomous driving, the application software of the ECU that calculates control information of a vehicle through complicated processing based on the output results of a large number of external sensors is configured by a collection of a large number of functions such as a sensor fusion and an action prediction of a moving body. Since the functional configuration of the application software described above often varies according to the contents of control realized in the ADAS and the autonomous driving and the type of vehicle, reusability of the application software when changing the functional configuration inside the software is also important. However, the conventional ECUs do not consider the reusability of the application software in the cases described above.

Based on the above circumstances, a main object of the present invention is to improve reusability of application software in an in-vehicle processing device.

Solution to Problem

According to the present invention, there is provided an in-vehicle processing device mounted on a vehicle including: a signal input unit that generates input data based on an input signal from outside; a processing unit that executes arithmetic processing for calculating output data based on the input data; a signal output unit that generates an output signal based on the output data to output the output signal to the outside; and a storage unit that stores application software for causing the processing unit to execute the arithmetic processing, in which the application software includes: a data management layer for managing object data which is a collection of data corresponding to a given target element on the storage unit; a data adaptation layer for generating the object data based on the input data to output the generated object data to the data management layer; and a data operation layer for acquiring the object data from the data management layer to calculate the output data based on the acquired object data.

Advantageous Effects of Invention

According to the present invention, the reusability of the application software in the in-vehicle processing device can be improved.

BRIEF DESCRIPTION OF DRAWINGS

FIG. 4 is a diagram showing an example of object data stored in an object data group.

FIG. 5 is a diagram showing an example of setting information stored in a setting information data group.

FIG. 6 is a diagram showing one example of an object data manipulation interface.

FIG. 7 is a diagram showing another example of the object data manipulation interface.

FIG. 8 is a diagram showing an example of a processing flow of application software in the in-vehicle processing device according to the embodiment of the present invention.

FIG. 10 is a diagram showing an example of a structure of the object data corresponding to a partial update of a cognition process.

FIG. 12 is a diagram showing an example of setting information stored in a setting information data group after the system has been changed.

DESCRIPTION OF EMBODIMENTS

Hereinafter, an embodiment of the present invention will be described with reference to the drawings. In the present embodiment, as an example of an in-vehicle processing device according to the present invention, a device that performs processing for realizing a driving support or a travel control of a vehicle in an ADAS or an autonomous driving system will be described.
(Configuration of Vehicle System)

Figure 1:
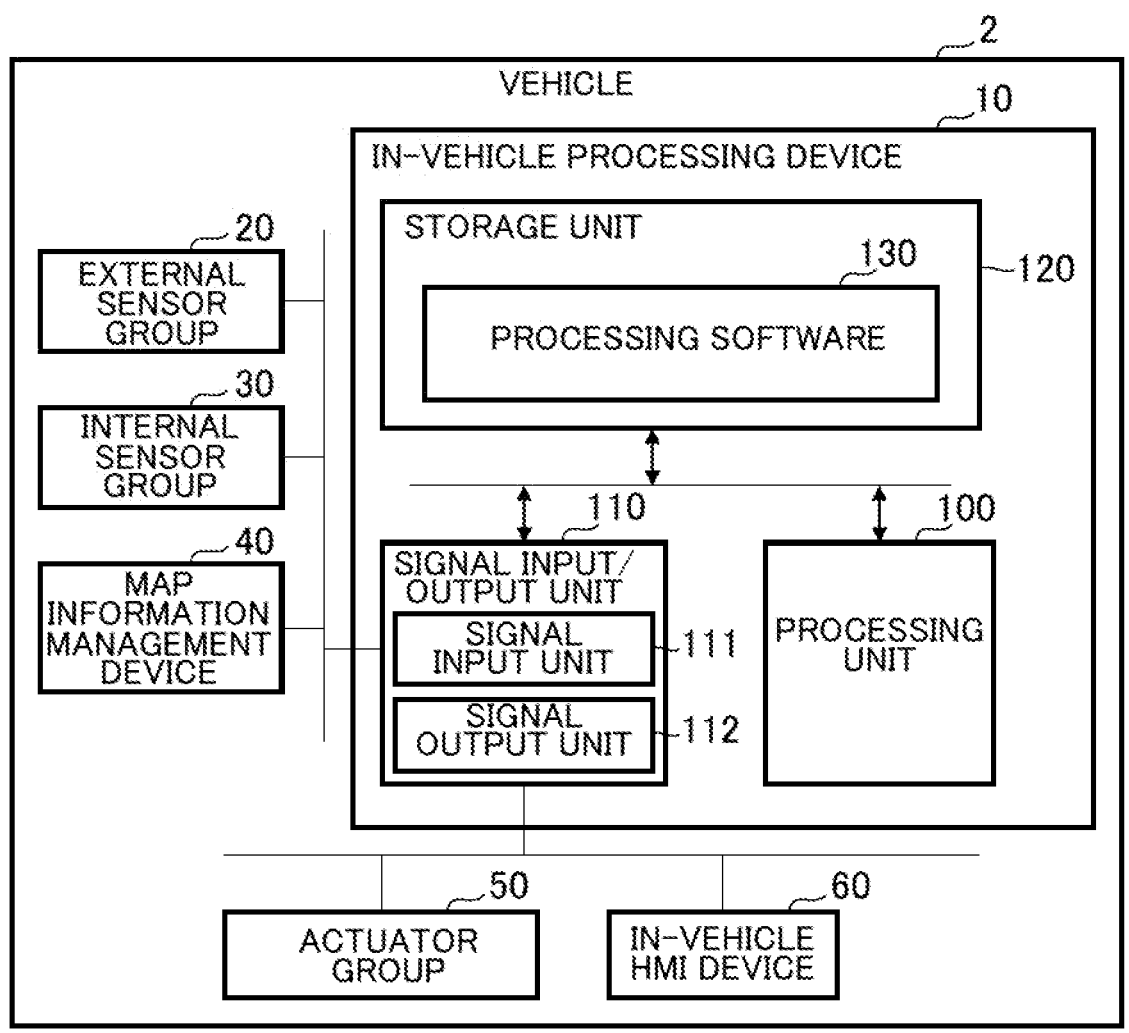
FIG. 1 is a functional block diagram showing an example of a configuration of a vehicle system including an in-vehicle processing device according to an embodiment of the present invention.

FIG. 1 is a functional block diagram showing an example of a configuration of a vehicle system 1 including an in-vehicle processing device according to the embodiment of the present invention. A vehicle system 1 according to the present embodiment is a system that is mounted in a vehicle 2, and recognizes a situation of obstacle such as a traveling road or a peripheral vehicle around the vehicle 2 for carrying out an appropriate driving support or traveling control. As shown in FIG. 1, the vehicle system 1 includes an in-vehicle processing device 10, an external sensor group 20, an internal sensor group 30, a map information management device 40, an actuator group 50, an in-vehicle HMI device 60, and the like.

The in-vehicle processing device 10 is formed of, for example, an ECU or the like mounted on the vehicle 2 and includes a processing unit 100, a signal input/output unit 110, and a storage unit 120. Various types of in-vehicle processing devices 10 are actually mounted on the vehicle system 1 according to differences in the contents of the processing to be realized and the devices to be controlled. FIG. 1 shows one of those in-vehicle processing devices 10 as a representative example.

The processing unit 100 includes, for example, a CPU (Central Processing Unit), a GPU (Graphics Processing Unit), an FPGA (Field-Programmable Gate Array), and the like. The processing unit 100 executes processing software 130 stored in the storage unit 120, to thereby perform processing for realizing a function of the in-vehicle processing device 10.

The signal input/output unit 110 includes a signal input unit 111 and a signal output unit 112. The signal input unit 111 converts an input signal from the outside of the in-vehicle processing device 10 into data, generates input data based on the input signal, and outputs the generated data to the processing unit 100. The processing unit 100 performs calculation of output data based on the input data. The signal output unit 112 generates an output signal based on the output data passed from the processing unit 100 and outputs the generated output signal to the outside of the in-vehicle processing device 10. The signal input/output unit 110 includes, for example, a circuit for A/D converting an analog signal, a circuit for inputting a pulse signal, a network card conforming to communication standards such as Ethernet (registered trademark) or CAN (Controller Area Network), and exchanges data based on various protocols with other devices mounted on the vehicle 2.

The storage unit 120 includes, for example, a storage device such as a RAM (Random Access Memory), an HDD (Hard Disk Drive), a flash memory, and a ROM (Read Only Memory). The storage unit 120 stores processing software 130 which is a program for realizing the functions of the in-vehicle processing device 10, data groups necessary for the processing, and the like. The storage unit 120 is also used as a main memory when the processing unit 100 executes the processing software 130.

The external sensor group 20 is a group of external sensors for detecting a state of the surroundings of the vehicle 2, and includes, for example, a camera device, a millimeter wave radar, a LIDAR, a sonar, or the like. The external sensor group 20 is configured to detect information on environmental elements such as obstacles (other vehicles, bicycles, pedestrians, falling objects, and so on) in a given range from the vehicle 2, road shapes (white lines, road ends, and so on), and traffic rules (road signs, signals, and so on), and outputs the detected information to the in-vehicle processing device 10 through an in-vehicle network such as a CAN.

The internal sensor group 30 is a collection of internal sensors that detect various state quantities (for example, traveling speed, steering angle, accelerator operation amount, brake operation amount, and so on) involved in the state of the vehicle 2. The internal sensor group 30 periodically outputs the detected state quantity to the in-vehicle processing device 10 through the in-vehicle network such as the CAN. The vehicle system 1 is configured such that each of the devices including the in-vehicle processing device 10 connected to the in-vehicle network can acquire a necessary state quantity from the internal sensor group 30 through the in-vehicle network.

The map information management device 40 is a device for managing and providing digital map information around the vehicle 2, and corresponds to, for example, a navigation device or the like. For example, the map information management device 40 has digital road map data representing an entire given area or an area around the vehicle 2. The map information management device 40 is configured to identify a map position (traveling road, lane, and so on) of the vehicle 2 on a map data based on the position information of the vehicle 2 determined through a global navigation satellite system (GNSS) receiving device or the like. In addition, the map information management device 40 is configured to provide the in-vehicle processing device 10 with the identified map position of the vehicle 2 and the map data around the map position.

The actuator group 50 is a group of devices that control the control elements such as steering, braking, and accelerator that determine the movement of the vehicle 2. The actuator group 50 is configured to control the movement of the vehicle 2 based on operation information such as a steering wheel, a brake pedal, an accelerator pedal, and the like, which are operated by the driver, and control information output from the in-vehicle processing device 10.

The vehicle HMI device 60 includes, for example, a speaker or a display device or the like mounted on the vehicle 2. The vehicle HMI device 60 is configured to notify the driver of information relating to the surrounding environment and a driving assistance which is output from the vehicle processor 10 through a voice or screen.

In the vehicle system 1 of FIG. 1, the in-vehicle processing device 10 exchanges information with any hardware of the external sensor group 20, the internal sensor group 30, the map information management device 40, the actuator group 50, and the in-vehicle HMI apparatus 60 according to the contents of the processing. In other words, the type of external hardware for which the multiple on-vehicle processing devices 10 actually mounted in the vehicle system 1 exchange the information differs depending on the type of the in-vehicle processing device 10.

(Configuration of Processing Software)

Figure 2:
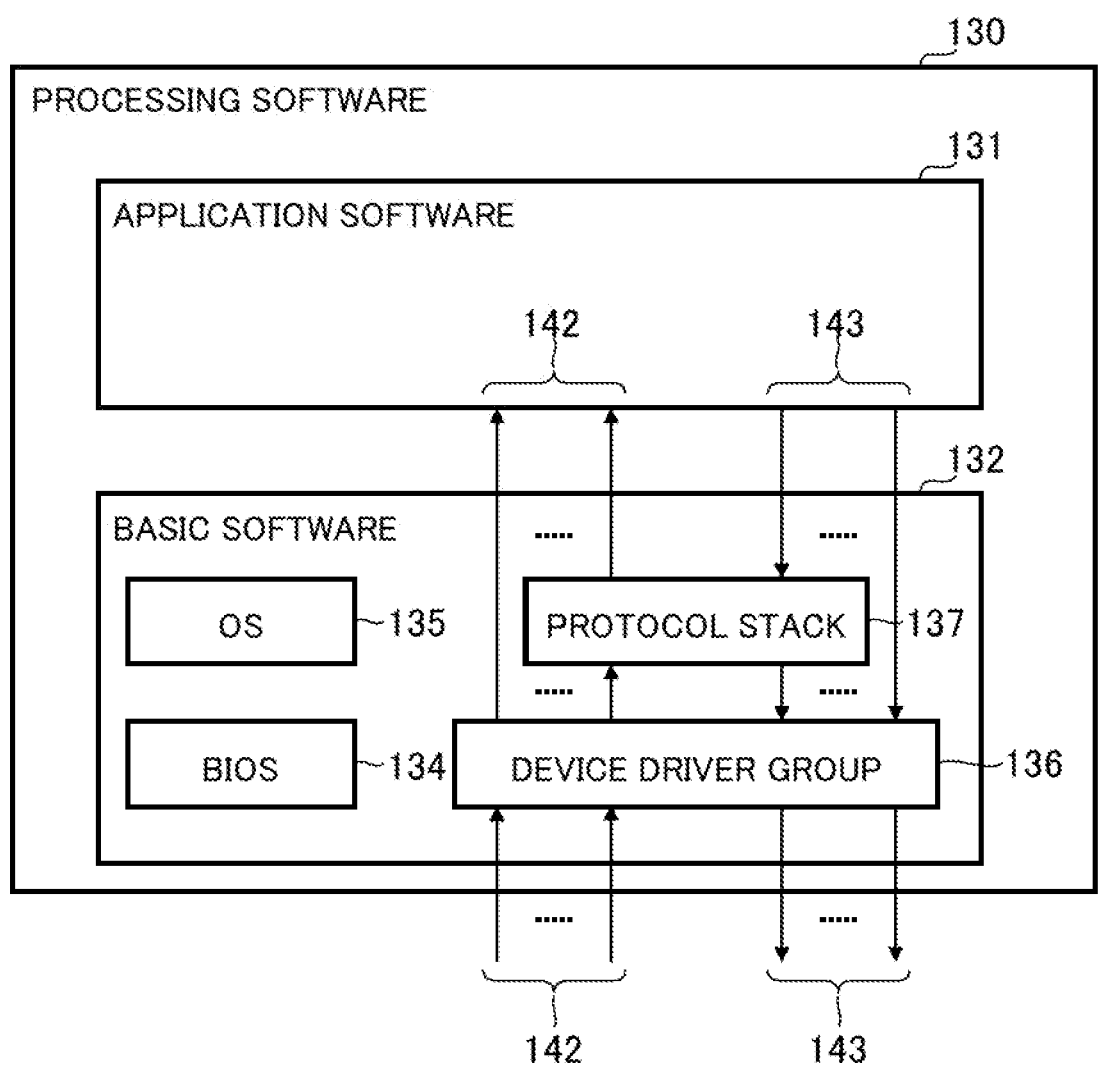
FIG. 2 is a diagram showing an example of a configuration of processing software in the in-vehicle processing device according to the embodiment of the present invention.

FIG. 2 is a diagram showing an example of the configuration of the processing software 130 in the in-vehicle processing device 10 according to the embodiment of the present invention. As shown in FIG. 2, the processing software 130 includes application software 131 and basic software 132.

The application software 131 is software that causes the processing unit 100 to execute processing and calculation for realizing the functions of the in-vehicle processing device 10. The configuration of the application software 131 is different for each type of the in-vehicle processing device 10 according to the contents of the processing realized by the in-vehicle processing device 10 and the configuration of the external hardware for exchanging information with the in-vehicle processing device 10. A specific example of the configuration of the application software 131 will be described later with reference to FIG. 3.

The basic software 132 is software that causes the processing unit 100 to execute processing for realizing the basic functions necessary for the operation of the in-vehicle processing device 10. The basic functions carried by the basic software 132 are common to all the in-vehicle processing devices 10 mounted in the vehicle system 1, irrespective of the configuration of the application software 131 and the configuration of external hardware that exchanges information. The basic software 132 includes, for example, a basic input/output system (BIOS) 134, an operating system (OS) 135, a device driver group 136, and a protocol stack 137. In the in-vehicle processing device 10, the processing section 100 can perform execution control of the application software 131 and data input/output with the signal input/ output section 110, with the use of the software configuring the basic software 132.

The BIOS 134 is software for causing the processing unit 100 to execute a process necessary when the in-vehicle processing device 10 is activated. With the use of the BIOS 134, the processing unit 100 performs, for example, reading of the OS 135 at the time of activation, basic input/output control for the storage unit 120, and the like.

The OS 135 is software that is responsible for processing necessary for execution control of the application software 131 in the processing unit 100. The processing unit 100 controls the execution schedule and the like, for example, for each execution unit (thread, process, task, etc.) of the application software 131 with the use of the OS 135.

The device driver group 136 is software for the processing unit 100 to input and output data with the signal input/output unit 110. The device driver group 136 provides the application software 131 with an interface for abstracting and handling the external hardware with which the in-vehicle processing device 10 exchanges information.

The protocol stack 137 is software for realizing necessary communication protocol processing between the application software 131 and the device driver group 136. The protocol stack 137 is responsible for the processing of a communication protocol operating on an upper layer with respect to a lower layer communication protocol processed by the signal input/output unit 110. As a result, as with the device driver group 136, the protocol stack 137 provides the application software 131 with an interface for abstracting and handling the external hardware for exchanging information with the in-vehicle processing device 10. The communication protocol handled by the protocol stack 137 includes, for example, IP (Internet Protocol), TCP (Transmission Control Protocol) and the like.

With the use of a general-purpose interface provided by the device driver group 136 and the protocol stack 137, the application software 131 can input and output data with respect to the signal input/output unit 110, without becoming conscious of a specific hardware configuration and specific input and output signals of the external hardware. The above general-purpose interface includes, for example, a socket interface.

In the processing unit 100, an input data 142 read from the signal input/output unit 110 is delivered to the application software 131 through the corresponding device driver group 136 and the protocol stack 137. On the other hand, the output data 143 delivered from the application software 131 is written out to the signal input/output unit 110 through the protocol stack 137 and the device driver group 136 in the same manner.

With the configuration of the processing software 130 as shown in FIG. 2, it is sufficient to change only a part (BIOS 134 and device driver group 136) of the basic software 132 even if there is a change in the hardware configuration of the in-vehicle processing device 10, and the application software 131 is available. Further, even if the configuration of the application software 131 in the in-vehicle processing device 10 or the configuration of the external hardware connected to the in-vehicle processing device 10 is changed, there is no need to change the basic software 132.

(Configuration of Application Software)

Figure 3:
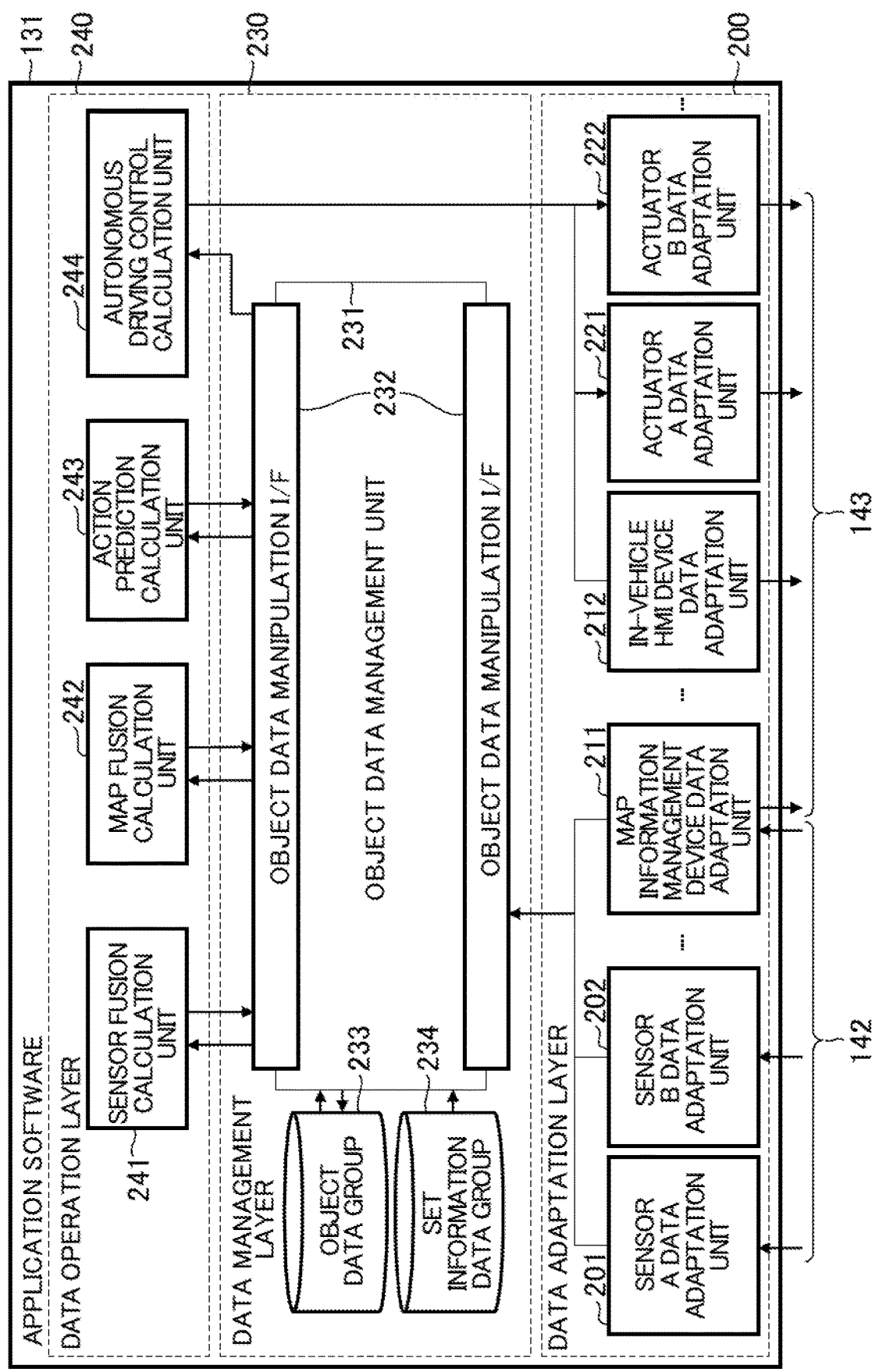
FIG. 3 is a diagram showing an example of a configuration of application software in the in-vehicle processing device according to the embodiment of the present invention.

FIG. 3 is a diagram showing an example of a configuration of the application software 131 in the in-vehicle processing device 10 according to the embodiment of the present invention. As shown in FIG. 3, the application software 131 includes three layers including a data adaptation layer 200, a data management layer 230, and a data operation layer 240.

The data adaptation layer 200 is a layer for converting a data format between a data format handled by the basic software 132 and a data format handled by the data management layer 230. As described above, the data handled in the interface provided by the device driver group 136 and the protocol stack 137 in the basic software 132 is usually data itself exchanged with the external hardware whose communication partner is the in-vehicle processing device 10. In other words, the data formats of the input data 142 and the output data 143 of the application software 131 are dependent on the specifications of the external sensor group 20, the internal sensor group 30, the map information management device 40, the actuator group 50, the in-vehicle HMI device 60, and the like shown in FIG. 1, which are connected to the in-vehicle processing device 10 as the external hardware. For that reason, the data adaptation layer 200 is made up of multiple software components corresponding to the respective external hardware. In an example of FIG. 3, the data adaptation layer 200 is configured by the respective software components of a sensor A data adaptation unit 201 and a sensor B data adaptation unit 202 corresponding to the external sensor group 20 and the internal sensor group 30, respectively, a map information management device data adaptation unit 211 corresponding to the map information management device 40, an in-vehicle HMI device data adaptation unit 212 corresponding to the in-vehicle HMI device 60, and an actuator A data adaptation unit 221 and an actuator B data adaptation unit 222 corresponding to the actuator group 50. Each of those software components converts the data format according to the respective data formats between the corresponding external hardware and the data management layer 230.

The data management layer 230 manages the data with the use of an abstracted data format called object data as will be described later. For that reason, each software component of the data adaptation layer 200 generates the object data based on the input data 142, outputs the generated object data to the data management layer 230, and generates the output data 143 based on the object data from the data management layer 230.

Depending on external hardware connected to the in-vehicle processing device 10, when the data is exchanged with the in-vehicle processing device 10, a given data communication procedure (for example, transmission of a data request, and so on) specific to the hardware may be required as a communication protocol higher than the protocol stack 137 in some cases. Processing of hardware-specific data communication protocols that cannot be handled by the basic software 132 is preferably absorbed in the corresponding software components in the data adaptation layer 200. For example, when acquiring the map information from the map information management device 40 as input data, the map data management device data adaptation unit 211 transmits, as the communication protocol process peculiar to the hardware as described above, a message requesting provision of the map information to the map information management device 40.

As described above, the application software 131 configures the data adaptation layer 200 with the respective software component corresponding to the external hardware independent of each other. For that reason, even if there is a change or addition of external hardware in the in-vehicle processing device 10, it is sufficient to change or add only the software component corresponding to the changed or added external hardware, which does not affect other software components. The data adaptation layer 200 converts a data format dependent on the external hardware into a data format not dependent on the external hardware by the individual software components to generate object data, and delivers the generated data to the data management layer 230 or the data operation layer 240 which is an upper layer. As a result, even if there is a change in or an addition to the configuration of the external hardware connected to the in-vehicle processing device 10, the data management layer 230 and the data operation layer 240 are less likely to be affected.

The data management layer 230 is a layer for providing functions for managing and manipulating data on the storage unit 120 (particularly on the RAM) and a common interface for other layers. The data management layer 230 manages and manipulates data on the storage unit 120 in units of the object data which is a collection of data corresponding to a given target element.

The "target element" to which the object data corresponds is a conceptual object which is commonly expressed by the individual information elements grouped together as the object data. The target element corresponds to, for example, detection targets of various sensors configuring the external object sensor group 20 and the internal sensor group 30, control targets of the various actuators configuring the actuator group 50, and so on. Preferably, in particular, in the respective external sensors configuring the external sensor group 20, the individual environmental elements (obstacle, road shape, traffic rule, and so on) recognized by the external sensors correspond to the target elements. In other words, it is preferable to adopt a method of not abstracting the hardware itself as the external sensor, but abstracting data as the object data with the environment elements which are the detection targets of the external sensor as a unit. In each of the internal sensors configuring the internal sensor group 30, the object data may be configured for the vehicle 2 in which each internal sensor detects a state quantity, or the object data may be configured for each of the individual detection targets (for example, vehicle speed information in the case of the vehicle speed sensor).

The data management layer 230 includes an object data management unit 231, an object data manipulation interface 232, an object data group 233, and a setting information data group 234.

The object data management unit 231 performs data manipulation on the object data group 233 managed on the storage unit 120 based on a data manipulation request received from another hierarchy through the object data manipulation interface 232, and returns the result. The data manipulation includes, for example, registration, update, retrieval, integration, and so on of the object data.

The object data manipulation interface 232 corresponds to an API (Application Programming Interface) for causing the data adaptation layer 200 and the data operation layer 240 which are other hierarchies to leverage the data manipulation function provided by the object data managing unit 231. The data structure of each object data configuring the object data group 233 is different according to the target element. For that reason, the object data manipulation interface 232 provides an interface (API) for arbitrary object data to be manipulated by a common operation method.

The object data group 233 is a collection of the object data managed by the object data management unit 231 on the storage unit 120.

The setting information data group 234 is a collection of setting information necessary for the object data management unit 231 to manage the object data group 233 and to perform data manipulations. When the structure of the object data is changed due to the configuration change of the external sensor or the like, the setting information corresponding to the object data is changed in the setting information data group 234 accordingly. As a result, the data management layer 230 is configured so as to be able to cope with a change in the object data without changing the object data management unit 231 and the object data manipulation interface 232.

The data operation layer 240 is a hierarchy for acquiring the object data to be calculated from the data management layer 230 and calculating the output data based on the object data. Normally, the process of calculating the output data is configured by the multiple processing blocks according to the calculation contents. For that reason, the data operation layer 240 is configured by the multiple software components corresponding to individual processing blocks. In an example of FIG. 3, the data operation layer 240 includes the respective software components of a sensor fusion arithmetic unit 241, a map fusion arithmetic unit 242, an action prediction arithmetic unit 243, and an autonomous driving control arithmetic unit 244. The control information on the autonomous driving in the vehicle 2 on which the in-vehicle processing device 10 is mounted is calculated by the arithmetic processing performed by each of those software components based on various kinds of information detected by the external sensor group 20 and the internal sensor group 30.

The sensor fusion arithmetic unit 241 identifies and integrates the object data for the same target element detected by the multiple external sensors included in the external sensor group 20 and interpolates missing data based on time series information. The map fusion arithmetic unit 242 compares the detection information from the external sensor with the information from the map data acquired from the map information management device 40, and adds the information on the map data (for example, a lane ID on which when another vehicle travels, and so on) as an attribute to the detection information from the external sensor. The action prediction arithmetic unit 243 performs processing for predicting a future action and movement trajectory of the moving body detected by the external sensor. The autonomous driving control arithmetic unit 244 determines the driving action, the traveling trajectory, a speed profile, and the like of the vehicle 2 based on the calculation results of the sensor fusion arithmetic unit 241, the map fusion arithmetic unit 242, and the action prediction arithmetic unit 243. Also, the autonomous driving control arithmetic unit 244 calculates the control information for the actuator group 50 and the display information for the in-vehicle HMI device 60 on the basis of the determined information, and outputs the calculation result is output to the data adaptation layer 200. n an example of FIG. 3, in order to absorb communication specifications specific to the actuator group 50 and the in-vehicle HMI device 60, the autonomous driving control arithmetic unit 244 generates the output data 143 through the in-vehicle HMI device data adaptation unit 212, the actuator A data adaption unit 221, and the actuator B data adaptation unit 222 of the data adaptation layer 200. Alternatively, without applying the above configuration, the autonomous driving control arithmetic unit 244 generates data in accordance with the communication specifications of the actuator group 50 and the in-vehicle HMI device 60 and outputs the output data 143 directly to the basic software 132 without passing through the data adaptation layer 200.

Now, a difference between the configuration of the application software 131 according to the present embodiment and the configuration of the application software according to the conventional art will be described. The conventional art has a two-hierarchy configuration having a hierarchy for abstracting interfaces (data) of the sensors and the actuators, that is, a hierarchy corresponding to the data adaptation layer 200 in FIG. 3 and a hierarchy for performing calculation with the use of the abstracted data, that is, a hierarchy corresponding to the data operation layer 240 in FIG. 3. On the other hand, the configuration of the application software 131 illustrated in FIG. 3 is characterized in that, in addition to the conventional data abstraction approach, the data management layer 230 for abstracting the data management and operation is introduced.

The calculation processing in ADAS and autonomous driving mainly includes a cognitive process for understanding the surrounding environment of the vehicle 2 at a high level based on information such as detection information from the external sensor and the like, and a determination process for determining the driving action and the traveling trajectory of the vehicle 2 based on the result of the cognitive process. Basically, those processes are performed in units of environment elements such as other vehicles and white lines. For that reason, the cognitive process and the determination process commonly include the data management and the data manipulation in units of environmental elements such as data management, target data search, and data provision to other software components in many cases. The present invention focuses on the above fact and makes it possible to abstract the data management and the data manipulation in units of environment elements in the data management layer 230 so as to commonly use the abstracted data management and manipulation, to thereby improve the development efficiency of software in the conventional arithmetic processing portion.

Further, as described above, even if the data structure of the object data managed by the object data management unit 231 is changed, the data management layer 230 is configured to be able to use the object data without changing the interface for other hierarchies by merely changing the setting of the setting information data group 234. For that reason, even in the situation where the reusability of software is limited only by the conventional approach of data abstraction, for example, even when changing the configuration of the external sensor which needs to change the data structure, the high reusability of software can be maintained.

In addition, with introduction of the data management layer 230, the application software 131 can functionally separate the data management function carried by the data management layer 230 and the arithmetic processing carried out by the data operation layer 240 from each other. For that reason, there are advantages that the independence of the arithmetic processing is improved, and a change and addition of the arithmetic processing becomes facilitated. In more detail, in the conventional method, in order to realize the exchange of data between software components configuring a processing block for each arithmetic processing, an interface for performing necessary data conversion between the software components is configured in a hierarchy comparable to the data operation layer 240 in FIG. 3. However, in the above method, there is a high possibility that a modification of a certain soft component will affect other software components. On the other hand, in the configuration of the application software 131 according to the present embodiment, in principle, each software component that performs arithmetic processing in the data operation layer 240 exchanges data with each other through the object data manipulation interface 232 of the data management layer 230. The object data manipulation interface 232 handles the data delivered between the software components of the data operation layer 240 as the abstracted object data, thereby providing a common API for each software component. This makes it unnecessary for each software component of the data operation layer 240 to be conscious of both a provider and the user of the data to be manipulated. As a result, the independence of each software component is enhanced, and each software component is less likely to be affected by changes or additions to other software components. Therefore, even when the functional configuration of the application software 131 is changed, high reusability of software can be maintained.

(Object Data)

FIG. 4 is a diagram showing an example of object data stored in the object data group 233. As described above, the object data group 233 is a collection of the object data managed by the object data management unit 231 on the storage unit 120. As shown in FIG. 4, each piece of object data in the object data group 233 includes a common data area 400 in which each information on an ID 401, a data source 402, an object type 403, and a time stamp 404, which is information common to all the object data, and a unique data area 405 in which information different for each object data is stored according to the type of the target element.

In the ID 401, an identifier for identifying the target element indicated by the object data is stored. The same value is set in the ID 401 for multiple pieces of object data indicating the same target element (for example, the same vehicle).

In the data source 402, information indicating the generation source of the object data is stored. For example, in the object data 410 whose value of the ID 401 is ID=100, "sensor A" is set in the data source 402. This indicates that the generation source of the object data 410 is a sensor A (in fact, the sensor A data adaptation unit 201) included in the external sensor group 20. In the object data 411 whose value of ID 401 is ID=1000, "sensor fusion" is set in the data source 402. This indicates that the generation source of the object data 411 is the sensor fusion arithmetic unit 241.

In the object type 403, information representing the conceptual type of the target element indicated by the object data is stored. Examples of the target element types stored in the object type 403 include other vehicles, pedestrians, white lines, and the like.

In the time stamp 404, time information on the object data is stored. The time information set in the time stamp 404 corresponds a time at which the object data is detected, for example, when the generation source of the object data represented by the data source 402 is a sensor included in the external sensor group 20 or the internal sensor group 30. As a result, when estimating a state of the object data at an arbitrary point in time, the object data can be subjected to a correction corresponding to the time. Note that the time stamp 404 may store different time information such as an update time of the object data in the data management layer 230, for example, according to a time management policy of the object data in the in-vehicle processing device 10.

In the unique data area 405, data different for each object data piece is stored according to the combination of the data source 402 and the object type 403. For example, since both the object data 410 whose value of the ID 401 is ID=100 and the object data 412 whose value of the ID 401 is ID=101 are both "sensor A" as the generation source indicated by the data source 402, the object data 410 and 412 represent the detection information on the same sensor A. However, the type of the target element represented by the object type 403 is "another vehicle" in the object data 410 and "pedestrian" in the object data 412. Therefore, the contents of the detection information from the sensor A represented by the object data are different from each other according to the difference of the target elements, and the data stored in the unique data area 405 is also different from each other. Further, for example, both of the object data 410 whose value of the ID 401 is ID=100 and the object data 413 whose value of the ID 401 is ID=200 indicate that the type of the target element represented by the object type 403 is "another vehicle". Therefore, the object data 410 and 413 represent the detection information on the same other vehicle. However, the generation source indicated by the data source 402 is "sensor A" in the object data 410 and "sensor B" in the object data 413. Therefore, the contents of the detection information on other vehicles represented by those pieces of object data are different from each other according to a difference between the specifications of the sensors A and B, and the data stored in the unique data area 405 is also different from each other.

The object data management unit 231 configures an index table of each object data stored in the object data group 233 with the use of the information stored in the ID 401, the data source 402, the object type 403 and the time stamp 404 in the common data area 400. For example, a hash table based on the value of the ID 401 is configured in the object data management unit 231 so that an appropriate object data can be detected at a high speed. Further, for example, a reference list for the appropriate object data is configured in the object data management unit 231 for each generation source of object data stored in the data source 402 and for each type of target element of each object data stored in the object type 403, so that multiple pieces of object data having the same source and target element type can be acquired at a high speed.

In an example of FIG. 4, an example of data stored in the unique data area 405 of each object data is described, but in fact, the data management layer 230 is configured so as to perform the data manipulation of each object data without being conscious of the contents of the data stored in the unique data area 405. For that reason, even if the configurations of the external sensor group 20 and the internal sensor group 30 are changed and the structure of the corresponding object data is changed, there is no need to modify software relating to data manipulation of the data management layer 230.

In addition, the data management layer 230 is configured to be able to manage a given number of object data (that is, multiple pieces of object data having the same value of ID 401) relating to the same target element in time series. In the example of FIG. 4, three pieces of object data 414 for the past three times in which the value of ID 401 is ID=300 and three pieces of object data 415 for past three times in which the value of ID 401 is ID=301 are stored. The management of the multiple pieces of object data in such a time series is realized with the use of a mechanism such as a ring buffer. The multiple pieces of object data in such a time series is effective for interpolation of missing data on the target element and prediction of a future state, and is used by the sensor fusion arithmetic unit 241, the action prediction arithmetic unit 243, and the like.

FIG. 4 shows object data representing detection information from various sensors as an example of object data stored in the object data group 233, but object data representing other information may be stored in the object data group 233. For example, the map information provided from the map information management device 40 may be decomposed for each given data unit (for example, for each road unit) and stored as the object data in the object data group 233. In addition, the output result from the software components excluding the environment component from the software components configuring the data operation layer 240 may be stored in the object data group 233 as the object data. As described above, since a structure of the object data is general-purpose, arbitrary information can be stored in the object data group 233 as the object data.

FIG. 4 shows an example in which the information on the ID 401, the data source 402, the object type 403 and the time stamp 404 is set in the common data area 400, but all of those pieces of information may not be set in the common data area 400. Arbitrary information can be set in the common data area 400 so that individual object data can be adequately managed and desired object data can be properly searched.

(Setting Information)

FIG. 5 is a diagram showing an example of the setting information stored in the setting information data group 234. As described above, the setting information data group 234 is a collection of setting information defining set values of a parameter group that need to be changed when the structure of the object data changes due to a change in the configuration of the external sensor or the like. The object data management unit 231 reads the setting information from the setting information data group 234 at the time of activation of the in-vehicle processing device 10. The object data management unit 231 performs the adaptation of the memory management structure and the data manipulation of the object data in the object data group 233 based on the setting information corresponding to each object data. This makes it possible to cope with a change in the object data without modifying the object data manipulation interface 232. As shown in FIG. 5, each piece of setting information in the setting information data group 234 includes a data source 501, an object type 502, a data length 503, a history number 504, and search key information 505.

The data source 501 and the object type 502 are the same as the data source 402 and the object type 403 in FIG. 4, respectively. The type (data type) of the object data targeted by each piece of setting information is defined by a combination of information stored in the data source 501 and the object type 502.

In the data length 503, a data length of the object data corresponding to the data type is stored.

In the history number 504, information indicating how many pieces of time-series data of the same target element is managed by the data management layer 230 is stored in the data type. For example, when the value stored in the history number 504 is 1, it is meant that only object data indicating the latest value is stored without having time series data.

In the search key information 505, setting information for performing data manipulations such as searching using the information elements of the object data stored in the unique data area 405 in FIG. 4 is stored. In the example of FIG. 5, in the search key information 505, an identifier (Key) of the information element, a data type (Type) of the information element, an offset value (Offset) from a head address of the object data to an address of the information element, is designated. For example, in the search key information 505 in the first data record of FIG. 5, in the object data whose generation source is the sensor A and whose type of the target element is another vehicle, the information elements of the "relative position" and the "relative speed" are a data type of "2D vector (two-dimensional vector)", and are stored at the position of 12 bytes and 20 bytes from the head, respectively. In this manner, the information element of the unique data area 405 can also be handled by the data manipulation of the object data manipulation interface 232 by adding the search key information 505 in the setting information. In other words, in the manipulation of the object data by the object data manipulation interface 232 includes the manipulation of searching and acquiring the object data having the unique data area 405 corresponding to a given search condition based on the setting information stored in the setting information data group 234.

In the present embodiment, a mode conforming to the different object data is taken by reading the setting information data group 234, but even if the setting information data group 234 does not exist, the feasibility of the data management layer 230 is not affected by absence of the setting information data group 234. For example, a sufficiently large fixed value may be set for the data length 503 or history number 504, and since the search key information 505 is an additional function, there is no problem even if the data length 503 and the history number 504 are not present. In addition, the object data management unit 231 may not read the setting information data group 234 at the time of execution of the application software 131, but may take other modes such as setting the setting information data group 234 statically at compile time.

(Object Data Manipulation Interface)

FIGS. 6 and 7 are diagrams showing an example of the object data manipulation interface 232. A pseudo code group C601 shown in FIG. 6 and a pseudo code group C701 shown in FIG. 7 represent a part of a header file in the case where the object data manipulation interface 232 is described in C language. In the pseudo code groups C 601 and C 701, examples of APIs and data types of the object data manipulation interface 232 are described.

The pseudo code group C601 includes a pseudo code 611 representing a registration API of the object data, a pseudo code 612 representing an update API of the object data, a pseudo code 613 representing an ID search API of the object data, a pseudo code 614 representing a search API of the object data, a pseudo code 615 representing an integrated API of object data, and a pseudo code 616 representing a history information search API of the object data. In the following, the APIs represented by those pseudo codes will be described.

The registration API (register Data) of the object data represented by the pseudo code 611 is an API of "registration operation" which is the operation of storing the object data newly input to the data management layer 230 in the object data group 233. In the registration operation, when the data management layer 230 is set to manage the multiple pieces of object data in a time series, the object data newly input is inserted into (added to) the multiple pieces of object data already stored in the object data group 233, as the latest value, and the manipulation is performed by shifting a generation of the stored time-series data one by one. On the other hand, when the object data is set not to be managed in the time series, the operation replacing the object data representing the same target element as that of the newly input object data with new object data is performed. As represented by the pseudo code 611, an argument of the registration API includes a data length of the object data to be registered and an address of the object data to be registered. As shown in FIG. 4, the beginning of the object data to be registered necessarily includes a common data area 400 configured by an ID 401, a data source 402, an object type 403, and a time stamp 404. The object data management unit 231 identifies a storage location of the object data in the object data group 233 based on those pieces of information stored in the common data area 400 and stores the object data in that location.

The update data API (updateData) of the object data represented by the pseudo code 612 is an API of "update manipulation" which is the operation of rewriting a part or all of the area of the object data stored in the object data group 233 on the basis of the object data newly input to the data management layer 230. When the data management layer 230 is set to manage the multiple pieces of object data in a time series, unlike the registration operation described above, some or all of the update object data in the multiple pieces of object data already stored in the object data group 233 is rewritten based on the object data newly input. As indicated by the pseudo code 612, in addition to the same information as the registration API, information for designating an area to be updated in the object data is added as an argument of the update API.

The ID search API (getDataByID) of the object data represented by the pseudo code 613 is an API of "ID search operation" which is an operation of searching the latest value of the object data having the ID to be designated from the object data stored in the object data group 233 and returning the searched latest value. As represented by the pseudo code 613, an argument of the ID search API includes an ID of the object data to be searched and the information on a buffer storing the search result.

The search API (searchData) of the object data represented by the pseudo code 614 is an API of "search operation" which is an operation of acquiring the object data corresponding to a given search condition from the object data stored in the object data group 233. As represented by the pseudo code 614, an argument of the search API includes a search conditional expression, a sort conditional expression, and information on a buffer storing the search result. In the search operation, the result of arraying a list of the object data corresponding to the search conditional expression according to the sort conditional expression is stored in the buffer.

The search conditional expression and the sort conditional expression in the search API are represented by a pseudo code group C 701 in FIG. 7, for example. The pseudo code group C 701 includes a pseudo code 711 representing a search conditional expression and a pseudo code 712 representing a sort conditional expression.

The pseudo code 711 defines a key (key) for designating an information element of the object data to be searched in the search conditional expression, a comparison operator (compOp) and a comparison target value for comparing and calculating the value of the information element designated by the key, and a logical operator (logicOp) for performing a logical operation on the result of the comparison operation. The search conditional expressions are expressed as those arrays, for example, as the following Expressions (1) and (2). However, Expressions (1) and (2) express search conditional expressions using an associative array (objectData) that returns the values corresponding to the keys given to the arguments. In the search API, the object data corresponding to a given search condition can be searched and acquired from the object data stored in the object data group 233 according to the search conditional expression.

$$\{objectData[key\ 0]<compOp0>value\ 0\}<logicOp0> \quad (1)$$

$$\{objectData[key1]<compOp1>value1\}<logicOp1> \quad (2)$$

The pseudo code 712 defines a key (key) for designating the sort objects and information elements of the object data in the sort conditional expression and a sort order (order) for sorting the information elements designated by the key. The sort conditional expressions are expressed as those arrays. In the search API, the object data corresponding to a given search condition can be sorted and acquired in accordance with the sort conditional expression described above in the sort order (ascending order, descending order, or the like) designated on the basis of the value of the designated key.

When there are multiple information elements corresponding to the keys of the search conditional expression and the sort conditional expression in the object data, a method of calculating a scalar value used for the comparison operation and the sorting may be separately defined. For example, if "2D Vector" is designated in the search conditional expression or the sort conditional expression for the object data including the information elements of a relative position and a relative speed, a length of the vector (a sum of squares of each element of the vector) is used to perform the comparison operation and sorting. This enables the operation such as a distance search.

Returning to the description of the pseudo code group C601 shown in FIG. 6, the integration API (mergeData) of the object data represented by the pseudo code 615 is an API of the "integrating operation" of integrating the two object data pieces stored in the object data group 233 into one. As represented by the pseudo code 615, the argument of the integration API includes an ID (destId) of integration destination object data and an ID (srcId) of the integration source object data. In the integration operation, multiple pieces of object data designated by the integration source ID is incorporated into multiple pieces of object data designated by the integration designation ID among the multiple pieces of object data managed by the data management layer 230 in a time series.

A history information search API (getHistoryData) of the object data represented by the pseudo code 616 is an API of "history information search operation" which is the operation of acquiring the multiple pieces of object data managed in a time series having an ID to be designated from the multiple pieces of object data stored in the object data group 233 as time series information of the object data. As represented by the pseudo code 616, an argument of the history information search API includes an ID of the object data to be searched and information of the buffer storing the search result.

As described above, the object data manipulation interface 232 defines arguments with a data type that does not depend on the data structure of object data. For that reason, even if there is a change in the configuration of the external hardware connected to the in-vehicle processing device 10, the functional configuration or the like mounted in the in-vehicle processing device 10, there is no need to modify the object data manipulation interface 232.

(Processing Flow of Application Software)

FIG. 8 is a diagram showing a processing flow 800 which is an example of a processing flow of the application software 131 in the in-vehicle processing device 10 according to the embodiment of the present invention. The processing flow 800 shown in FIG. 8 is periodically executed by the application software 131 in the processing unit 100 of the in-vehicle processing device 10, for example, at a given time interval (100 ms or the like). In the present embodiment, the processing of the application software 131 will be described as the processing flow 800 in which the processing steps are sequentially executed. However, each processing step may be executed asynchronously based on a given event, or may be executed in parallel.

In the processing flow 800, the processing unit 100 first executes the external input processing (S801). This external input process is a process in which each software component of the data adaptation layer 200 processes the input data 142 notified from the basic software 132 and registers the object data in the data management layer 230. As shown in FIG. 3, the data adaptation layer 200 includes, as software components corresponding to input data 142 from the hardware connected to the outside of the in-vehicle processing device 10, a sensor A data adaptation unit 201, a sensor B data adaptation unit 202, a map information management device data adaptation unit 211, and the like. Those software components analyze the input data 142 from the corresponding external hardware based on their respective communication specifications and extract information on the target elements. Subsequently, the data adaptation layer 200 converts the extracted information into a format of object data corresponding to the target element, and stores the converted information in the object data group 233 through the registration API of the object data manipulation interface 232. Incidentally, the format of the object data in this example includes not only the data structure but also representation specifications (for example, unit system, coordinate system, time system, and so on) of each information element. For example, in a coordinate system, a reference point of the vehicle 2 is set as the origin, a front direction of the vehicle 2 is defined as an x axis, and a left direction is set as a y axis, in a rectangular coordinate system. Further, since the data expressed by the external sensor varies depending on the mounting position of the sensor in the vehicle 2 and the specification of the sensor, the data is converted into a common coordinate system so that each of the software components of the data processing layer 240 can execute the arithmetic processing without being conscious of the sensor specific specifications. Similarly, in a time system, since a delay time (a difference between a time at which a target element is detected and a time at which the data is output) is different according to the specification of an external sensor, the delay time is corrected to set a time stamp of the object data.

As shown in FIG. 4, the object data includes a common data area 400 including an ID 401, a data source 402, an object type 403, and a time stamp 404, and a unique data area 405. In the present embodiment, in the object data corresponding to the detection information of the external sensor, the data structure can be modeled in the manner to be described below, to be able to enhance the reusability of the software.

Figure 9:
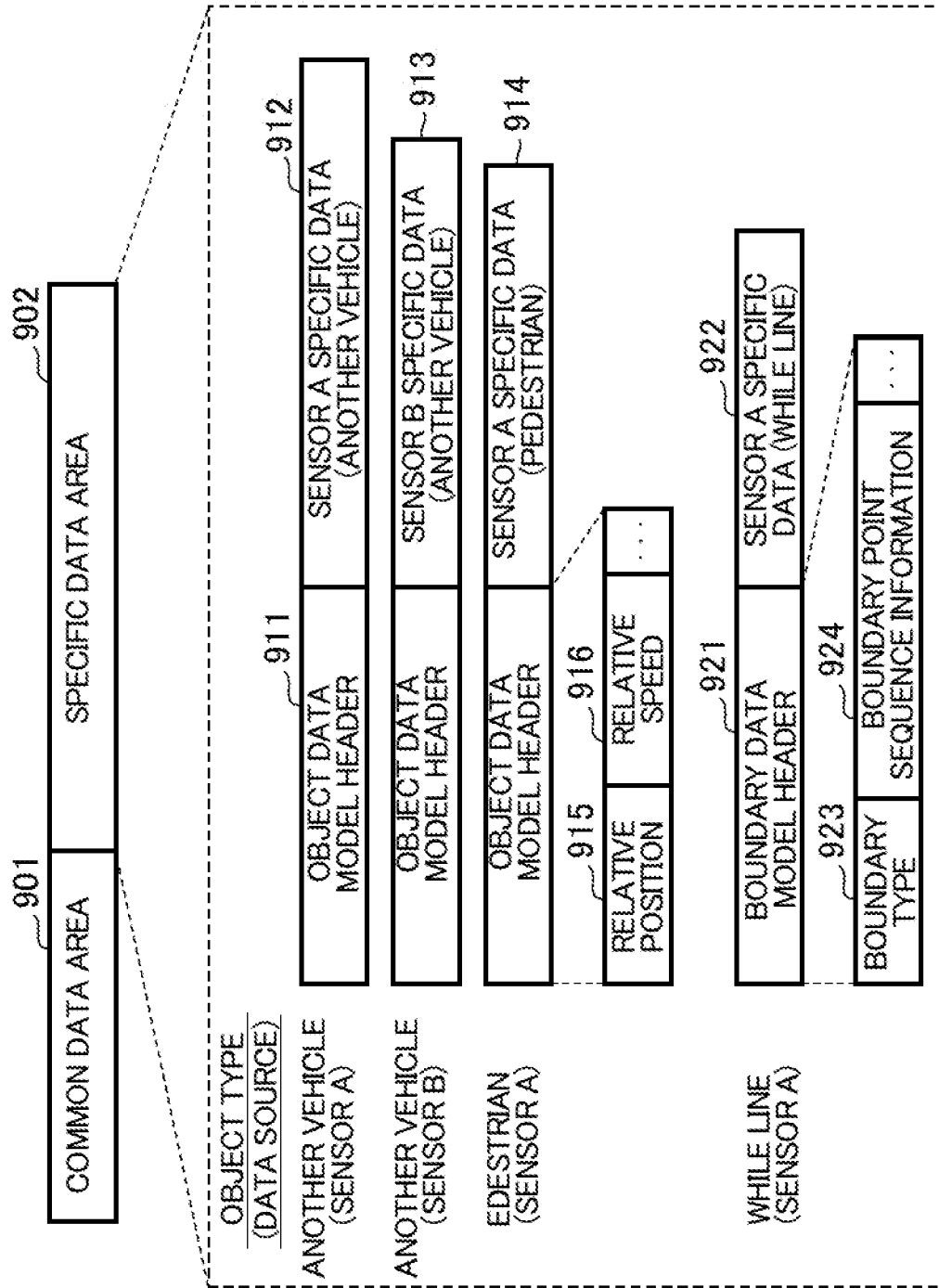
FIG. 9 is a diagram showing an example of modeling the object data.

FIG. 9 is a diagram showing an example of modeling the object data. In the structural example of the object data shown in FIG. 9, the common data area 901 and the unique data area 902 correspond to the common data area 400 and the unique data area 405 in FIG. 4, respectively. Although the information stored in the unique data area 902 is different according to the data source and the object type, the similarity of the information elements in the unique data area 405 becomes high when expressing the target elements having the similar properties. Therefore, a data model is configured for each target element having close properties, and the unique data area 902 is divided into a data model header and unique data. Specifically, as shown in FIG. 9, the object type is another vehicle, a pedestrian, a bicycle or the like, and a common object data model header 911 is applied to each object data of the target element concerning those objects. The object data model header 911 includes, for example, a relative position 915, a relative speed 916, and the like. On the other hand, the object type is a white line, a parking frame, a road boundary, or the like, and a common boundary data model header 921 is applied to each object data of the target element concerning the boundary line and the area. The boundary data model header 921 includes, for example, a boundary type 923 (a white line, a parking frame, and so on), boundary point sequence information 924 (a dot sequence representing a boundary shape), and the like. In this way, the multiple pieces of object data expressing the target elements having the common properties are combined together to establish a common data model for those object data, thereby being capable of defining a data area portion based on a common definition. As a result, portions (various unique data 912, 913, 914, 922, and soon) that are affected by the configuration change of the external sensor in the object data can be localized and distinguished from other portions. This makes it possible to further enhance the reusability of software.

The process flow 800 in FIG. 8 will be described again. Upon completion of the external input process in Step S801, the processing unit 100 subsequently proceeds to various arithmetic processing of the data operation layer 240. Steps S802 to S805 are arithmetic processing by the sensor fusion arithmetic unit 241, the map fusion arithmetic unit 242, the action prediction arithmetic unit 243, and the autonomous driving control arithmetic unit 244, respectively.

Each arithmetic processing in Steps S802 to S804 is arithmetic processing for understanding (cognizing) the surrounding environment of the vehicle 2. For that reason, each arithmetic processing in Steps S802 to S804 is hereinafter also referred to as a cognitive process. The sensor fusion arithmetic unit 241, the map fusion arithmetic unit 242, and the action prediction arithmetic unit 243 which execute those arithmetic processes (cognitive processes) are also referred to as environmental cognition software components.

The cognitive process to be executed by the environmental cognition software component is a process for estimating a state of each target element in a higher level by combination of fragmentary detection information obtained from each external sensor with information obtained by a map, a communication, or the like. For example, when the target vehicle is a preceding vehicle of the vehicle 2, the sensor fusion arithmetic processing (S802) can grasp only physical characteristics such as a relative position and a relative speed that can be detected by the external sensor alone. On the other hand, the map fusion arithmetic processing (S803) can estimate which lane the preceding vehicle is traveling with what positional relationship with the vehicle 2 by comparison with the map data. Also, the action prediction arithmetic process (S804) can estimate how the preceding vehicle will move in the future. Those processes can be regarded as a process of estimating and adding a new state quantity relating to the target element, that is, a process of adding a new information element to the object data of the target element.

In view of the characteristics of the cognitive process as described above, in the present embodiment, the object data can be configured with the data structure as shown in FIG. 10. FIG. 10 is a diagram showing an example of the structure of the object data corresponding to a partial update of the cognitive process. In the data structure shown in FIG. 10, the unique data area 902 in the object data is classified according to the updating target of each arithmetic processing, and is configured as separate records (continuous areas on the memory). Specifically, a basic information record 1001 to be updated in the sensor fusion arithmetic processing, a map attribute record 1002 to be updated in the map fusion arithmetic processing, and a prediction information record 1003 to be updated in the action prediction arithmetic processing configure a unique data area 902.

In the object data having the data structure shown in FIG. 10, the estimation result of the target element by the sensor fusion arithmetic processing executed by the sensor fusion arithmetic unit 241 in Step S802 is stored in the basic information record 1001. On the other hand, the estimation result of the target element by the map fusion arithmetic processing executed by the map fusion arithmetic unit 242 in Step S803 is stored in the map attribute record 1002. In addition, the estimation result of the target element by the action prediction arithmetic processing executed by the action prediction arithmetic unit 243 in Step S804 is stored in the prediction information record 1003. As a result, each of the sensor fusion arithmetic unit 241, the map fusion arithmetic unit 242, and the action prediction arithmetic unit 243, which is an environmental cognition software component, can store the estimation result of the state of the target element by each cognitive processing in separate data areas of the object data.

The data model header in the structural example of the object data shown in FIG. 9, that is, the object data model header 911 and the boundary data model header 921 may be included in the data structure shown in FIG. 10. In that case, the data model header may be included in the basic information record 1001, or the data model header may be distributed in each record of the basic information record 1001, the map attribute record 1002, and the prediction information record 1003.

The pseudo codes C1004 to C1007 shown in FIG. 10 are examples in which the structure of the object data in FIG. 10 and the object update processing in each cognition processing in Steps S802 to S804 are described. In the sensor fusion arithmetic process in Step S802, since the object data integrating the object data of various external sensors is newly generated, the registration API is used for updating the object data as represented by the pseudo code C1005. On the other hand, in the map fusion arithmetic processing of Step S803 and the action prediction arithmetic processing of Step S804, portions corresponding to the map attribute record 1002 and the prediction information record 1003 are updated with the use of the update API as represented by the pseudo codes C1006 and C1007, respectively.

Adoption of the data structure described above in the object data brings about the following two effects. Firstly, as a first effect, in the update process of the object data represented by the pseudo codes C1006 and C1007, the memory areas different from each other are updated. This makes it possible to execute the map fusion arithmetic processing and the action prediction arithmetic processing in parallel. Accordingly, when the processing unit 100 is configured by multiple processors or multiple cores, those arithmetic processing can be efficiently executed. Next, as a second effect, the software reusability at the time of addition and change of software components relating to new arithmetic processing is improved. In other words, in the case of adding the new arithmetic processing, a new record may be added to the structure of the object data represented by the pseudo code C1004 and the addition of the new arithmetic processing does not affect a reference relationship on the existing program, so pseudo code C1006, as a result of which the pseudo code C1006 and the pseudo code C1007 may not be modified. In the same manner, when the data structure is also changed by changing the arithmetic processing, since a portion that needs to be changed is limited to each record of the basic information record 1001, the map attribute record 1002, and the prediction information record 1003, the change in the data structure does not affect other arithmetic processing.

The autonomous driving control arithmetic processing in Step S805 is a process for calculating the control information of the vehicle 2 based on the result of each cognition processing in Steps S802 to S804. Based on the object data generated by each cognition process in Steps S802 to S804, the autonomous driving control arithmetic unit 244 makes a plan for the driving action of the vehicle 2 (for example, whether to follow a lane, change the lane, or the like) and for traveling track (including speed information) based on the driving action. Then, the autonomous driving control arithmetic unit 244 calculates a control command value for the actuator group 50 necessary for execution of the driving action and following of a traveling trajectory.

The processing flow 800 in FIG. 8 will be described again. Upon completion of the autonomous driving control calculation processing in Step S805, the processing unit 100 proceeds to the external output processing (S806). In the external output process of Step S806, the processing unit 100 converts a control command value for the actuator group 50 calculated by the autonomous driving control arithmetic unit 244 in Step S805 into a data format conforming to the communication specification of each actuator, and outputs the converted data as output data 143 to the basic software 132. The conversion of that data format is performed by the software component of the data adaptation layer 200 corresponding to each actuator, that is, the actuator A data adaptation unit 221 and the actuator B data adaptation unit 222 in FIG. 3.

Through the processing flow as described above, the processing of one cycle of the application software 131 shown in FIG. 3 is executed. In the in-vehicle processing device 10, the processing according to the processing flow 800 is periodically executed (for example, every 100 ms) in the processing unit 100, to thereby realize the functions of the ADAS and the autonomous driving.

(Modification of Application Software)

Figure 11:
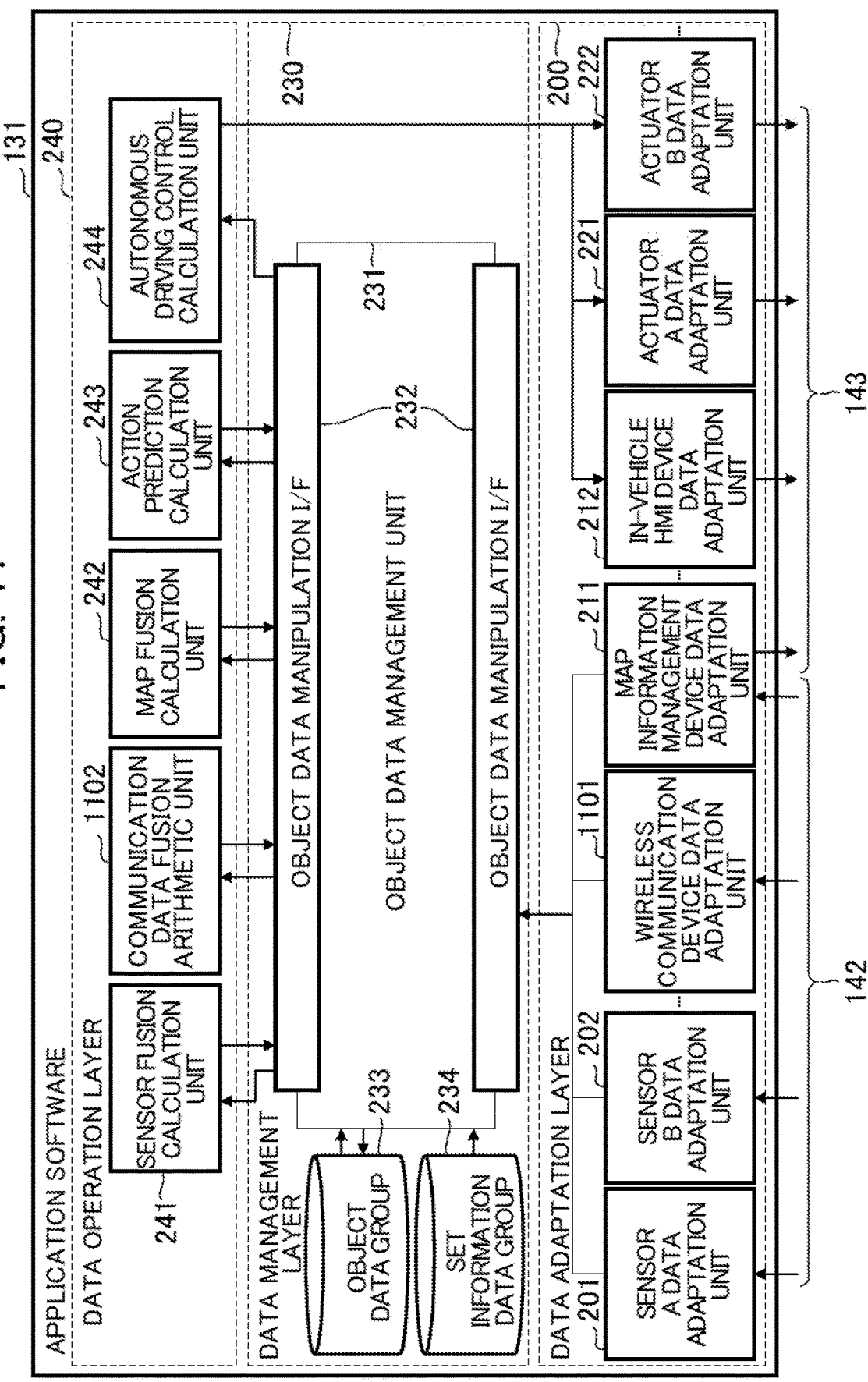
FIG. 11 is a diagram showing an example of a configuration of application software after a change in the in-vehicle processing device according to the embodiment of the present invention.

Next, with reference to an example of FIG. 11, a method of modifying the application software 131 in the case where there is a change in the external hardware configuration or the functional configuration in the in-vehicle processing device 10 will be described. FIG. 11 is a diagram showing an example of the configuration of the changed application software 131 in the in-vehicle processing device 10 according to the embodiment of the present invention. FIG. 11 shows a configuration example of the software 131 in the case where a wireless communication device is added as external hardware connected to the in-vehicle processing device 10 and a system change is made to enhance the advanced autonomous driving control taking into consideration information from the wireless communication device.

The wireless communication device described above is, for example, a device for realizing a communication with a road infrastructure (road-vehicle communication) or a communication with another vehicle (inter-vehicle communication). The in-vehicle processing device 10 is configured to be able to acquire, as the information from the wireless communication device, information on road infrastructure such as congestion, construction, signals and the like and information on other vehicles (accelerator opening degree, brake information, traveling route information, and so on). For that reason, there is new additional information that cannot be acquired from the external sensor or the map information, and the new additional information is used, thereby being capable of advancing the calculation of the autonomous driving control.

In data that can be acquired by the wireless communication device (hereinafter referred to as communication data), the position of the object represented by the data is usually represented by a global coordinate system (latitude, longitude). On the other hand, the data acquired by the external sensor group 20 is expressed in a vehicle coordinate system centering on the vehicle 2. For that reason, in order to integrate the sensor data and the communication data together, the sensor fusion arithmetic processing by the sensor fusion arithmetic unit 241 cannot be applied and a new arithmetic processing needs to be added. Also, in adding information on communication data, there is a need to modify the structure of the object data of the corresponding target element (another vehicle, or the like). In the application software 131 of the present embodiment, in addition to the modification of the autonomous driving control arithmetic unit 244, the system modification described above can be realized by the addition of the wireless communication device data adaptation unit 1101 in the data adaptation layer 200, the addition of the definition information on new object data to the setting information data group 234 in the data management layer 230, and the addition of the communication data fusion arithmetic unit 1102 in the data operation layer 240.

First, a modified portion of the data management layer 230 will be described. The modification of the data management layer 230 is realized by modifying the setting information data group 234. FIG. 12 is a diagram showing an example of setting information stored in the changed setting information data group 234. In FIG. 12, in order to store various data acquired from the wireless communication device, a setting information record having a wireless communication device as a data source is added. In FIG. 12, only setting information records corresponding to the object data relating to other vehicles are shown as additional setting information records, but setting information records corresponding to other object data may be further added. In addition, in FIG. 12, in order to add the information on the communication data, a data length of some of object data related to the communication data among object data on sensor fusion is changed in accordance with information addition. In the data management layer 230, the system modification can be realized only by modifying those pieces of setting information, and the object data management section 231 and the object data manipulation interface 232 can be used as they are.

Next, a modified portion of the data adaptation layer 200 will be described. The modification of the data adaptation layer 200 is realized by adding the wireless communication device data adaptation unit 1101 as shown in FIG. 11. The wireless communication device data adaptation unit 1101 converts a format of various data specific to the wireless communication device into a format of the object data managed by the data management layer 230 and stores the converted data in the object data group 233. As described above, since each software component of the data adaptation layer 200 is independent of each other, other software components are not affected by the addition of the wireless communication device data adaptation unit 1101. Further, as described above, since the object data manipulation interface 232 of the data management layer 230 is also not changed, existing software components of the data adaptation layer 200 can be used as they are.

Finally, a modified portion of the data operation layer 240 will be described. The modification of the data operation layer 240 is realized by adding a communication data fusion arithmetic unit 1102 as shown in FIG. 11, except for correction by the autonomous driving control arithmetic unit 244. The communication data fusion computation unit 1102 acquires a data group including object data whose generation source is sensor fusion associated with the communication data and object data whose generation source is a wireless communication device from the object data management unit 231, and identifies and integrates the object data for the same target element based on a given calculation. For example, when the object data generated by a sensor fusion indicating another vehicle and object data (communication data) from a wireless communication device similarly indicating another vehicle correspond to the same target element, the former object data is added with the information of the communication data and updated.

Figure 13:
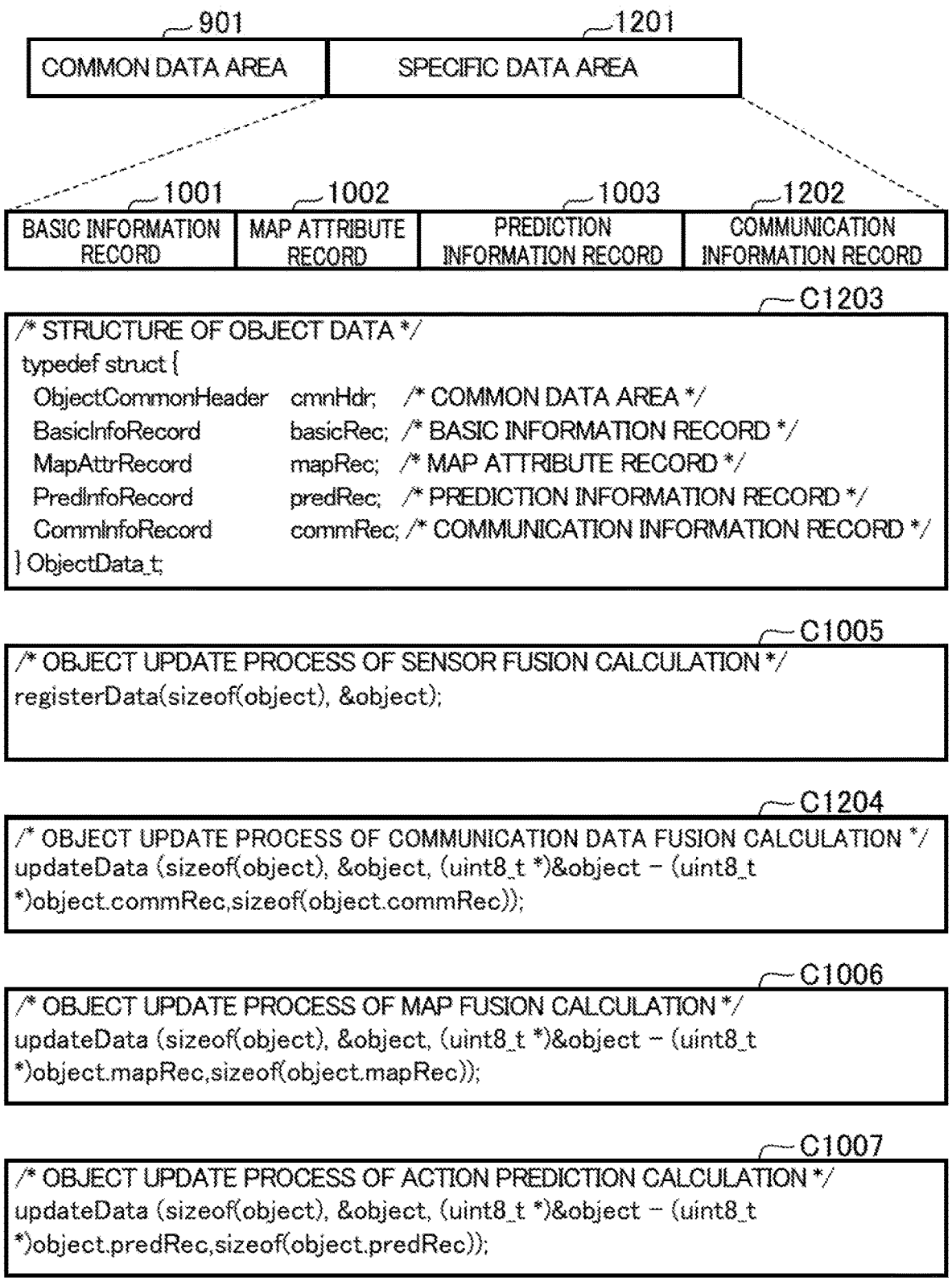
FIG. 13 is a diagram showing an example of a structure of the object data when a system change has been made.

FIG. 13 is a diagram showing an example of the structure of the object data of the sensor fusion when the system is modified. In the data structure of FIG. 13, a communication information record 1202 is added to the unique data area 1201, as compared with the data structure before the system change shown in FIG. 10. The pseudo codes C1203 and C1204 shown in FIG. 13 are examples in which the structure of the object data in FIG. 13 and the communication data fusion calculation executed by the communication data fusion arithmetic unit 1102 are described, respectively. In the pseudo code C1203, a structure corresponding to the communication information record 1202 is added to the pseudo code C1004 representing the structure of the unchanged object data shown in FIG. 10. The communication data fusion arithmetic unit 1102 is implemented on the data operation layer 240 in a method indicated by the pseudo code C1204, and realizes the data fusion calculation for adding the information on the communication data to the object data and updating the information.

In this example, the pseudo codes C1005, C1006, and C1007 representing the update processing of the object data by the existing software parts are not changed at all from the contents shown in FIG. 10. The first reason is that each software component of the data operation layer 240 inputs and outputs data through the abstracted object data manipulation interface 232 and there is no dependence relationship between the software components. In other words, since there is no dependence relationship between the software components, even if the communication data fusion arithmetic unit 1102 is added to the data operation layer 240, the existing other software components are not affected, so that there is no need for modification. The second reason is that since a memory area handled by each software component is defined separately, even if a structure of the object data to be manipulated is changed, the influence does not propagate to the existing software component. With the above mechanism, even when the system change is made, the respective software components of the sensor fusion arithmetic unit 241, the map fusion arithmetic unit 242, and the action prediction arithmetic unit 243 can be used as they are.

In the present embodiment, with the employment of the configuration of the application software 131 as described above, the reusability of the application software 131 can be enhanced even in a case where the reusability is difficult in the conventional art such that the data structure and the functional configuration of the in-vehicle processing device 10 has been changed. Therefore, in various aspects, the reusability of the application software 131 in the in-vehicle processing device 10 can be improved.

As described above, according to the present embodiment, the application software 131 is hierarchized into three hierarchies including the data adaptation layer 200, the data management layer 230, and the data operation layer 240, and data management and manipulation are abstracted so as to be able to be commonly leveraged. As a result, since the data management and manipulation portion conventionally required to be individually mounted for each software component that performs arithmetic processing can be reused, development efficiency of the application software 131 is improved. In addition, since an interface of the data management layer 230 is configured so as not to change even when the data structure to be managed is changed, even in the case of changing the configuration of the external sensor, the data management and manipulation portion of each software component can be used as it is.

Further, according to the present embodiment, the application software 131 are hierarchized into three hierarchies of the data adaptation layer 200, the data management layer 230, and the data operation layer 240, thereby being capable of functionally separating the data management and the arithmetic processing from each other. For that reason, independence of the arithmetic processing is improved, and the change and addition of the arithmetic processing becomes facilitated. In the present software configuration, in principle, data exchange between the software components of the data operation layer 240 is performed through the object data manipulation interface 232 of the data management layer 230. Since the object data manipulation interface 232 is abstracted, it is not necessary for each software component of the data operation layer 240 to be conscious of both the provision source and the user destination of the data to be manipulated. As a result, the independence of each software component is enhanced, each software component is less likely to be affected by a change or addition of other software components, and there is a high possibility that existing software components can be reused even when the functional configuration is changed.

According to the embodiment of the present invention described above, the following operational effects are obtained.

(1) The in-vehicle processing device 10 mounted on the vehicle 2 includes the signal input unit 111 that generates the input data 142 based on the input signal from the outside, the processing unit 100 that executes the arithmetic processing for calculating the output data 143 based on the input data 142, the signal output unit 112 for generating an output signal based on the output data 143 to output the output signal to the outside, and the storage unit 120 for storing the application software 131 for causing the processing unit 100 to execute the arithmetic processing. The application software 131 includes the data management layer 230 for managing the object data which is a collection of the data corresponding to a given target element on the storage unit 120, the data adaptation layer 200 for generating the object data based on the input data 142 to output the generated object data to the data management layer 230, and the data operation layer 240 for acquiring the object data from the data management layer 230 to calculate the output data 143 based on the acquired object data. With the above configuration, the reusability of the application software 131 in the in-vehicle processing device 10 can be improved.

(2) The data management layer 230 has the object data manipulation interface 232 for the data adaptation layer 200 and the data operation layer 240 to manipulate the object data managed by the data management layer 230. The object data manipulation interface 232 is configured to be able to manipulate the multiple pieces of object data having different data structures by a common operation method. With the above configuration, the application software 131 can be provided, which makes it possible to flexibly cope with various system configuration changes, such as a change in the external hardware connected to the in-vehicle processing device 10, a change in the functional configuration in the in-vehicle processing device 10, or the like, and has the high reusability.

(3) The manipulation of the object data by the object data manipulation interface 232 includes the search operation for acquiring the object data corresponding to the search condition that can be designated as the argument from the object data managed by the data management layer 230. The search condition in this search operation is represented by the search conditional expression including the comparison operation on the information elements configuring the object data as represented in Expressions (1) and (2), for example. The manipulation of the object data can also include a logical operation as a result of the multiple comparison operations. Further, in the search operation, the object data corresponding to the search condition can be acquired by sorting based on the sort condition that can be designated as the argument. With the above configuration, the application software 131 can be provided which can selectively acquires the process of extracting arbitrary desired object data without causing the respective software components of the data operation layer 240 and the data adaptation layer 200 to implement the process of extracting the desired object data from the entire object data, individually, and has the high reusability.

(4) Further, the operation of the object data by the object data manipulation interface 232 includes the registration operation of replacing the object data managed by the data management layer 230 with the object data newly input to the data management layer 230, and the update operation for rewriting some of the object data managed by the data management layer 230 based on the object data newly input to the data management layer 230. This makes it possible to appropriately manage the object data in the data management layer 230 based on the calculation result by each software component of the data operation layer 240 and the input information from each software component of the data adaptation layer 200.

(5) The data management layer 230 is configured to be able to manage the multiple pieces of object data related to the same target element in time series. In that case, the manipulation of the object data by the object data manipulation interface 232 includes the operation of acquiring the multiple pieces of object data managed by the data management layer 230 in time series. In addition, the data management layer 230 includes the registration operation of adding the object data newly input to the data management layer 230 to the multiple pieces of object data managed by the data management layer 230 in time series, and a plurality of objects managed by the data management layer 230 in time series, and the update operation of rewriting some of the latest object data among the data multiple pieces of object data managed by the data management layer 230 in time series based on the object data newly input to the data management layer 230. Furthermore, the data management layer 230 includes the integrating operation of incorporating the multiple pieces of object data related to the second target element managed by the data management layer 120 into the multiple pieces of object data related to the first target element managed by the data management layer 230. With the above configuration, the multiple pieces of object data in time series can be appropriately managed in the data management layer 230.

(6) The object data includes the common data area 400 in which the common information is stored for all the object data managed by the data management layer 230, and the unique data area 405 in which information different depending on the type of the target element is stored. The common data area 400 includes at least one of the ID 401 which is an identifier for identifying the target element, the data source 402 which is information indicating the generation source of the object data, and the object type 403 which is information indicating the conceptual type of the target element, and the time stamp 404 which is time information on the object data. With the above configuration, in the data management layer 230, the individual object data having different data structures can be managed and manipulated by the common interface.

(7) The data management layer 230 has the setting information data group 234 which is a collection of the setting information on the object data. The manipulation of the object data by the object data manipulation interface 232 includes the search operation of acquiring the object data having the unique data area 405 corresponding to the search condition that can be designated as the argument from the object data managed by the data management layer 230 based on the search key information 505 in the setting information. With the above configuration, the arbitrary object data can also be searched and acquired for the information element of the unique data area 405 by the data manipulation of the object data manipulation interface 232.

(8) The data operation layer 240 is configured by the multiple software components, and data is exchanged between the multiple software components through the data management layer 230. With the above configuration, the application software 131 can be provided, which can enhance the independence of each software component in the data operation layer 240, and has high reusability even when changing the functional configuration in the in-vehicle processing device 10.

(9) The multiple software components in the data operation layer 240 includes, for example, the sensor fusion arithmetic unit 241, the map fusion arithmetic unit 242, the action prediction arithmetic unit 243, and the like as the environmental cognition software components causing the processing unit 100 to execute the cognition processing for estimating the state of the target element in the surrounding environment of the vehicle 2 based on the object data acquired from the data management layer 230. Those environmental cognition software components store the estimation result of the state of the target element in the object data managed by the data management layer 230. At this time, each of those environmental cognition software components stores the estimation result of the state of the target element in the separate data area in the object data managed by the data management layer 230, that is, the basic information record 1001, the map attribute record 1002, the prediction information record 1003. With the above configuration, when the processing unit 100 is configured by the multiple processors or the multiple cores, the multiple cognition processes can be executed in parallel to improve the efficiency of processing. In addition, the addition and change of the software components in the data operation layer 240 becomes easy, and the reusability of the application software 131 can be further improved.

The embodiment described above is an example, and the present invention is not limited to the above embodiment. In other words, various applications are possible, and every embodiment is included in the scope of the present invention. For example, in the embodiment described above, the in-vehicle processing device 10 has one processing unit 100 and one storage unit 120, and each processing in the in-vehicle processing device 10 is executed with the use of the processing unit 100 and the storage unit 120. However, the in-vehicle processing device 10 may have multiple processing units 100 and multiple storage units 120, and each processing may be executed with the use of the multiple processing units 100 and the multiple storage units 120. In that case, for example, the processing software having the same configuration may be installed in different storage units 120, and the processing may be executed by being shared by the multiple processing units 100.

In the embodiment described above, each process of the in-vehicle processing device 10 is realized by executing the given operation program with the use of the processor and the RAM configuring the processors 100 and 120, respectively. Alternatively, each processing of the in-vehicle processing device 10 can also be realized with unique hardware as necessary. In the embodiment described above, the in-vehicle processing device 10, the external sensor group 20, the internal sensor group 30, the map information management device 40, the actuator group 50, and the in-vehicle HMI device 60 are described as individual devices, but the above configuration can be realized by the combination of any two or more of the above components as necessary.

In the embodiment described above, the example in which the present invention is applied to the software of the in-vehicle processing device 10 used in the vehicle system 1 has been described. Alternatively, the present invention can also be applied to software of a processing device and an arithmetic device mounted in another system. For example, the present invention can also be applied to software and the like of an arithmetic deice which is mounted on a robot system and executes various arithmetic processing involved in the control of a robot.

Further, the drawings show control lines and information lines which are considered to be necessary for describing the embodiments, and all the control lines and information lines included in the actual products to which the present invention is applied are not necessarily shown. In fact, it may be conceivable that almost all the configurations are mutually connected to each other.

The disclosure content of the following priority application is incorporated herein as a quotation.

Japanese Patent Application No. 2016-195804 (filed Oct. 3, 2016).

LIST OF REFERENCE SIGNS

1: vehicle system, 2: vehicle, 10: in-vehicle processing device, 20: external sensor group, 30: internal sensor group, 40: map information management device, 50: an actuator group, 60: in-vehicle HMI device, 100: processing unit, 110: signal input/output unit, 111: signal input unit, 112: signal output unit, 120: storage unit, 130: processing software, 131: application software, 132: basic software, 134: BIOS, 135: OS, 136: device driver group, 137: protocol stack, 200: data adaptation layer, 230: data management layer, 240: data operation layer

The invention claimed is:

1. An in-vehicle processing device mounted on a vehicle, comprising:
a signal input unit that generates input data based on an input signal from outside;
a processing unit that executes arithmetic processing for calculating output data based on the input data;
a signal output unit that generates an output signal based on the output data to output the output signal to the outside; and
a storage unit that stores application software for causing the processing unit to execute the arithmetic processing,
wherein the application software includes:
a data management layer for managing object data which is a collection of data corresponding to a given target element on the storage unit;

a data adaptation layer for generating the object data based on the input data to output the generated object data to the data management layer; and a data operation layer for acquiring the object data from the data management layer to calculate the output data based on the acquired object data, wherein a data structure dependent on sensors or devices is converted to a data structure abstracted in the data adaptation layer from a dependent format on sensors or devices to independent format on sensors or devices and the converted data is stored in the data management layer, and data formats of the input data and of the output data of the application software are dependent on: i) specifications of an external sensor group, ii) specifications of an internal sensor group, iii) a map information management device, iv) actuator group, and v) an in-vehicle HMI device.

2. The in-vehicle processing device according to claim 1, wherein the data management layer has an interface for the data adaptation layer and the data operation layer to operate the object data managed by the data management layer, and the interface is configured to be able to operate a plurality of the object data pieces having different data structures by a common operation method.

3. The in-vehicle processing device according to claim 2, wherein the operation on the object data by the interface includes a search operation for acquiring the object data corresponding to a search condition that can be specified as an argument from the object data managed by the data management layer.

4. The in-vehicle processing device according to claim 3, wherein the search condition is represented by a search conditional expression including a comparison operation on an information element configuring the object data.

5. The in-vehicle processing device according to claim 4, wherein the search conditional expression further includes a logical operation of results of the plurality of the comparison operations.

6. The in-vehicle processing device according to claim 3, wherein the search operation sorts and acquires the object data corresponding to the search condition based on the sort condition that can be specified as an argument.

7. The in-vehicle processing device according to claim 2, wherein the operation of the object data by the interface includes:

a registration operation for replacing the object data managed by the data management layer with object data newly input to the data management layer; and an updating operation for rewriting some of the object data managed by the data management layer on the basis of the object data newly input to the data management layer.

8. The in-vehicle processing device according to claim 2, wherein the data management layer is configured to be able to manage a plurality of object data pieces involved in the same target element in time series, and the operation on the object data by the interface includes an operation of acquiring the plurality of object data pieces managed by the data management layer in time series.

9. The in-vehicle processing device according to claim 8, wherein the operation on the object data by the interface includes:

a registration operation of adding the object data newly input to the data management layer to the plurality of object data pieces managed by the data management layer in time series; and an updating operation for rewriting some of latest object data among a plurality of object data pieces managed in time series by the data management layer based on the object data newly input to the data management layer.

10. The in-vehicle processing device according to claim 8, wherein the operation on the object data by the interface includes an integrating operation of incorporating a plurality of object data pieces involved in a second target element managed by the data management layer in time series into a plurality of object data pieces involved in a first target element managed by the data management layer in time series.

11. The in-vehicle processing device according to claim 2, wherein the object data includes a common data area in which information common to all the object data managed by the data management layer is stored, and a unique data area in which information different depending on the type of the target element is stored, and the common data area includes at least one of an identifier for identifying the target element, information indicating a generation source of the object data, information indicating a conceptual type of the target element, and time information on the object data.

12. The in-vehicle processing device according to claim 11, wherein the data management layer has setting information on the object data, and the operation on the object data by the interface includes a search operation for acquiring the object data having the unique data area corresponding to the search condition that can be specified as the argument from the object data managed by the data management layer based on the setting information.

13. The in-vehicle processing device according to claim 1, wherein the data operation layer is configured by a plurality of software components, and the data transfer between the plurality of software components is performed through the data management layer.

14. The in-vehicle processing device according to claim 13, wherein the plurality of software components include an environmental cognition software component that causes the processing unit to execute a cognitive process for estimating a state of the target element in a surrounding environment of the vehicle based on the object data acquired from the data management layer, and the environmental cognition software component stores an estimation result of a state of the target element in object data managed by the data management layer.

15. The in-vehicle processing device according to claim 14, wherein the plurality of software components include a plurality of the environmental cognition software components, and each of the plurality of environmental cognition software components stores estimation results of states of the target elements in separate data areas in object data managed by the data management layer.

16. The in-vehicle processing device mounted on a vehicle according to claim 1, wherein the data structure is a common data structure between a plurality of sensors.

* * * * *